US012513331B2

United States Patent
Berger et al.

(10) Patent No.: US 12,513,331 B2
(45) Date of Patent: Dec. 30, 2025

(54) COMPRESSION PARAMETER REPORTING

(71) Applicant: QUALCOMM Incorporated, San Diego, CA (US)

(72) Inventors: Peer Berger, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 18/181,531

(22) Filed: Mar. 9, 2023

(65) Prior Publication Data

US 2024/0305762 A1  Sep. 12, 2024

(51) Int. Cl.
*H04N 19/597* (2014.01)
*H04N 13/10* (2018.01)
(Continued)

(52) U.S. Cl.
CPC .......... *H04N 19/597* (2014.11); *H04N 13/10* (2018.05); *H04N 13/106* (2018.05); *H04N 13/156* (2018.05); *H04N 13/161* (2018.05); *H04N 13/194* (2018.05); *H04N 13/20* (2018.05); *H04N 13/204* (2018.05); *H04N 13/239* (2018.05); *H04N 19/146* (2014.11);
(Continued)

(58) Field of Classification Search
CPC .. H04N 19/395; H04N 13/106; H04N 13/139; H04N 13/10; H04N 13/161; H04N 13/156; H04N 13/20; H04N 13/204; H04N 13/239; H04N 19/33; H04N 19/597
See application file for complete search history.

(56) References Cited

U.S. PATENT DOCUMENTS

2011/0050935 A1*  3/2011  Mukherjee ........... H04N 19/597
                                                    348/222.1
2011/0052087 A1*  3/2011  Mukherjee ............. H04N 19/14
                                                      382/248
(Continued)

FOREIGN PATENT DOCUMENTS

CN       108600751 A  *  9/2018
WO    WO-2015031780 A1    3/2015

OTHER PUBLICATIONS

EPO, Machine Translation of CN 108600751 A (Year: 2018).*
(Continued)

*Primary Examiner* — David N Werner
(74) *Attorney, Agent, or Firm* — Holland & Hart LLP

(57) ABSTRACT

Methods, systems, and devices for wireless communications are described. A wireless device may receive, from a first source device, a first quantity of frames that may be compressed in accordance with a first compression scheme and may receive, from a second source device, a second quantity of frames that may be compressed in accordance with the first compression scheme. The wireless device may transmit, to at least the first source device, a compression level report that indicates a second compression scheme for compression of additional quantities of frames from the first source device, where the second compression scheme may be associated with reduced processing with respect to processing associated with the first compression scheme, where the reduced processing may be based on a correlation between the first content of the first quantity of frames and the second content of the second quantity of frames.

28 Claims, 25 Drawing Sheets

(51) Int. Cl.
  *H04N 13/106* (2018.01)
  *H04N 13/156* (2018.01)
  *H04N 13/161* (2018.01)
  *H04N 13/194* (2018.01)
  *H04N 13/20* (2018.01)
  *H04N 13/204* (2018.01)
  *H04N 13/239* (2018.01)
  *H04N 19/146* (2014.01)
  *H04N 19/30* (2014.01)
  *H04N 19/33* (2014.01)
  *H04N 19/91* (2014.01)

(52) U.S. Cl.
  CPC ........... *H04N 19/33* (2014.11); *H04N 19/395* (2014.11); *H04N 19/91* (2014.11)

(56) References Cited

U.S. PATENT DOCUMENTS

| | | | | |
|---|---|---|---|---|
| 2012/0047229 | A1* | 2/2012 | Bennett | H04N 21/2665 709/217 |
| 2013/0258050 | A1* | 10/2013 | Kodavalla | H04N 19/395 348/43 |
| 2014/0218477 | A1* | 8/2014 | Pawelski | H04N 13/254 348/46 |
| 2015/0271522 | A1* | 9/2015 | Panahpour Tehrani | H04N 13/111 375/240.12 |
| 2017/0230656 | A1* | 8/2017 | Leontaris | H04N 19/117 |

OTHER PUBLICATIONS

A. Aaron, R. Zhang, & B. Girod, "Wyner-Ziv Coding of Motion Video", 36 Asilomar Conference on Signals, Systems and Computers 240-244 (Nov. 2002) (Year: 2002).*

3GPP TR 26.928: "3rd Generation Partnership Project, Technical Specification Group Services and System Aspects, Extended Reality (XR) in 5G (Release 17)", V17.0.0, Apr. 7, 2022, XP052146234, 130 pages, pp. 43, 44, paragraph 4.8 paragraph [6.2.5.6].

Cen N., et al., "Compressed Sensing Based Low-Power Multi-View Video Coding and Transmission in Wireless Multi-Path Multi-Hop Networks", IEEE Transactions on Mobile Computing, IEEE Service Center, Los Alamitos, CA, US, vol. 21, No. 9, Jan. 7, 2021, pp. 3122-3137, XP011916144, figure 1 p. 3127-p. 3129.

Girod B., et al., "Distributed Video Coding", Proceedings of the IEEE, New York, US, vol. 93, No. 1, Jan. 1, 2005, pp. 71-83, XP011123854, figure 1 pp. 71-74 pp. 77, 78.

International Search Report and Written Opinion—PCT/US2024/018323—ISA/EPO—Jun. 25, 2024.

* cited by examiner

COMPRESSION PARAMETER REPORTING

FIELD OF TECHNOLOGY

The following relates to wireless communications, including compression parameter reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems and wireless communication devices (e.g., UEs, network entities, wearable devices) may support functionalities related to virtual reality (VR), augmented reality (AR), or similar applications which may collectively be referred to as extended reality (XR) applications. Such applications may be supported through the use of one or more XR devices (e.g., XR headsets or other devices each having a quantity of cameras) in communication with a wireless device such as a UE, network entity, a cloud edge processor at a network entity, or the like.

SUMMARY

The described techniques relate to improved methods, systems, devices, and apparatuses that support compression parameter reporting. For example, the described techniques provide for a user equipment (UE) to adjust a video frame compression level at an extended (XR) reality device (e.g., XR node) by leveraging a correlation between video frames captured by a first XR node and video frames captured by a second XR node (e.g., captured by two XR headsets or two camera devices collocated at a single XR headset). In other words, when multiple XR headsets or multiple camera devices collocated at a single XR headset each provide video frames whose content overlaps, efficiencies in compression may be realized due to the overlapping content of the video frames. The described techniques relate to compression parameter reporting that allows for the improved compression efficiencies due to the overlapping content of video frames from multiple XR devices or cameras associated with XR devices.

A method for wireless communication at a wireless communications device is described. The method may include receiving, from a first source device, a first quantity of frames that are compressed in accordance with a first compression scheme, the first quantity of frames representative of first content recorded by the first source device, receiving, from a second source device, a second quantity of frames that are compressed in accordance with the first compression scheme, the second quantity of frames representative of second content recorded by the first source device, and transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

An apparatus for wireless communication at a wireless communications device is described. The apparatus may include a processor, memory coupled with the processor, and instructions stored in the memory. The instructions may be executable by the processor to cause the apparatus to receive, from a first source device, a first quantity of frames that are compressed in accordance with a first compression scheme, the first quantity of frames representative of first content recorded by the first source device, receive, from a second source device, a second quantity of frames that are compressed in accordance with the first compression scheme, the second quantity of frames representative of second content recorded by the first source device, and transmit, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

Another apparatus for wireless communication at a wireless communications device is described. The apparatus may include means for receiving, from a first source device, a first quantity of frames that are compressed in accordance with a first compression scheme, the first quantity of frames representative of first content recorded by the first source device, means for receiving, from a second source device, a second quantity of frames that are compressed in accordance with the first compression scheme, the second quantity of frames representative of second content recorded by the first source device, and means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

A non-transitory computer-readable medium storing code for wireless communication at a wireless communications device is described. The code may include instructions executable by a processor to receive, from a first source device, a first quantity of frames that are compressed in accordance with a first compression scheme, the first quantity of frames representative of first content recorded by the first source device, receive, from a second source device, a second quantity of frames that are compressed in accordance with the first compression scheme, the second quantity of frames representative of second content recorded by the first source device, and transmit, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

Some examples of the method, apparatuses, and non-transitory computer-readable medium described herein may further include operations, features, means, or instructions for determining a set of compression parameters for the second compression scheme for the compression of the additional quantities of frames from first source device, where the compression level report includes an indication of the set of compression parameters.

Some examples of the method, apparatuses, and non-transitory computer-readable medium described herein may further include operations, features, means, or instructions for estimating a joint probability distribution function associated with the first quantity of frames and the second quantity of frames and estimating a first entropy associated with the first quantity of frames and a second entropy associated with the second quantity of frames, where the correlation may be based on one or more of the joint probability distribution function, the first entropy, and the second entropy.

In some examples of the method, apparatuses, and non-transitory computer-readable medium described herein, the compression level report includes one or more of the joint probability distribution function and the method, apparatuses, and non-transitory computer-readable medium may include further operations, features, means, or instructions for receiving a third quantity of frames that may be compressed in accordance with a third compression scheme, the third quantity of frames representative of third content recorded by the first source device based on the compression level report and a corresponding capability of the first source device.

Some examples of the method, apparatuses, and non-transitory computer-readable medium described herein may further include operations, features, means, or instructions for receiving, from the first source device, the second source device, or both, a capability message that indicates a corresponding source device may be enabled to switch from processing video frames in accordance with the first compression scheme to processing video frames in accordance with a different compression scheme.

Some examples of the method, apparatuses, and non-transitory computer-readable medium described herein may further include operations, features, means, or instructions for transmitting, to the first source device and the second source device, a capability message that indicates the wireless communications device may be enabled to determine the correlation between the first content of the first quantity of frames and the second content of the second quantity of frames and transmit the compression level report.

In some examples of the method, apparatuses, and non-transitory computer-readable medium described herein, the second compression scheme indicates a change in bit rate, discrete cosine transform decimation rate, error correcting coding rate, or any combination thereof, with respect to the first compression scheme.

In some examples of the method, apparatuses, and non-transitory computer-readable medium described herein, the first source device and the second source device each include an XT reality device each having at least one camera.

In some examples of the method, apparatuses, and non-transitory computer-readable medium described herein, the first source device and the second source device each include a camera of an XR device.

In some examples of the method, apparatuses, and non-transitory computer-readable medium described herein, the wireless communications device includes a UE, a network entity, or a cloud edge processing unit.

A method for wireless communication at a first source device is described. The method may include transmitting, to a wireless communications device, a first quantity of frames that are compressed in accordance with a first compression scheme, the first quantity of frames representative of first content recorded by the first source device, receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device, and transmitting, to the wireless communications device, a third quantity of frames that are compressed in accordance with the second compression scheme, the third quantity of frames representative of third content recorded by the first source device.

An apparatus for wireless communication at a first source device is described. The apparatus may include a processor, memory coupled with the processor, and instructions stored in the memory. The instructions may be executable by the processor to cause the apparatus to transmit, to a wireless communications device, a first quantity of frames that are compressed in accordance with a first compression scheme, the first quantity of frames representative of first content recorded by the first source device, receive, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device, and transmit, to the wireless communications device, a third quantity of frames that are compressed in accordance with the second compression scheme, the third quantity of frames representative of third content recorded by the first source device.

Another apparatus for wireless communication at a first source device is described. The apparatus may include means for transmitting, to a wireless communications device, a first quantity of frames that are compressed in accordance with a first compression scheme, the first quantity of frames representative of first content recorded by the first source device, means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device, and means for transmitting, to the wireless communications device, a third quantity of frames that are compressed in accordance with the second compression scheme, the third quantity of frames representative of third content recorded by the first source device.

A non-transitory computer-readable medium storing code for wireless communication at a first source device is described. The code may include instructions executable by a processor to transmit, to a wireless communications device, a first quantity of frames that are compressed in accordance with a first compression scheme, the first quantity of frames representative of first content recorded by the first source device, receive, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device, and transmit, to the wireless communications device, a third quantity of frames that are compressed in accordance with the second compression scheme, the third quantity of frames representative of third content recorded by the first source device.

In some examples of the method, apparatuses, and non-transitory computer-readable medium described herein, the compression level report includes a first set of compression parameters for the first source device, a second set of compression parameters for the second source device, or both.

In some examples of the method, apparatuses, and non-transitory computer-readable medium described herein, the correlation may be determined based on an estimated joint probability distribution function associated with the first quantity of frames and the second quantity of frames, a first entropy associated with the first quantity of frames, and a second entropy associated with the second quantity of frames.

In some examples of the method, apparatuses, and non-transitory computer-readable medium described herein, the compression level report includes one or more of the estimated joint probability distribution function and the method, apparatuses, and non-transitory computer-readable medium may include further operations, features, means, or instructions for determining the second compression scheme based on a capability of the first source device and the compression level report, where transmitting the third quantity of frames processed in accordance with the second compression scheme may be based on the determining.

Some examples of the method, apparatuses, and non-transitory computer-readable medium described herein may further include operations, features, means, or instructions for transmitting a capability message that indicates that the first source device may be enabled to switch from processing video frames in accordance with the first compression scheme to processing video frames in accordance with a different compression scheme.

Some examples of the method, apparatuses, and non-transitory computer-readable medium described herein may further include operations, features, means, or instructions for receiving a capability message that indicates the wireless communications device may be enabled to determine the correlation between the first content of the first quantity of frames and the second content of the second quantity of frames and transmit the compression level report.

In some examples of the method, apparatuses, and non-transitory computer-readable medium described herein, the second compression scheme indicates a change in bit rate, discrete cosine transform decimation rate, error correcting check coding rate, or any combination thereof, with respect to the first compression scheme.

In some examples of the method, apparatuses, and non-transitory computer-readable medium described herein, the first source device and the second source device each include an XR device each having at least one camera.

In some examples of the method, apparatuses, and non-transitory computer-readable medium described herein, the first source device and the second source device each include a camera of an XR device.

In some examples of the method, apparatuses, and non-transitory computer-readable medium described herein, the wireless communications device includes a UE, a network entity, or a cloud edge processing unit.

DETAILED DESCRIPTION

Figure 1:
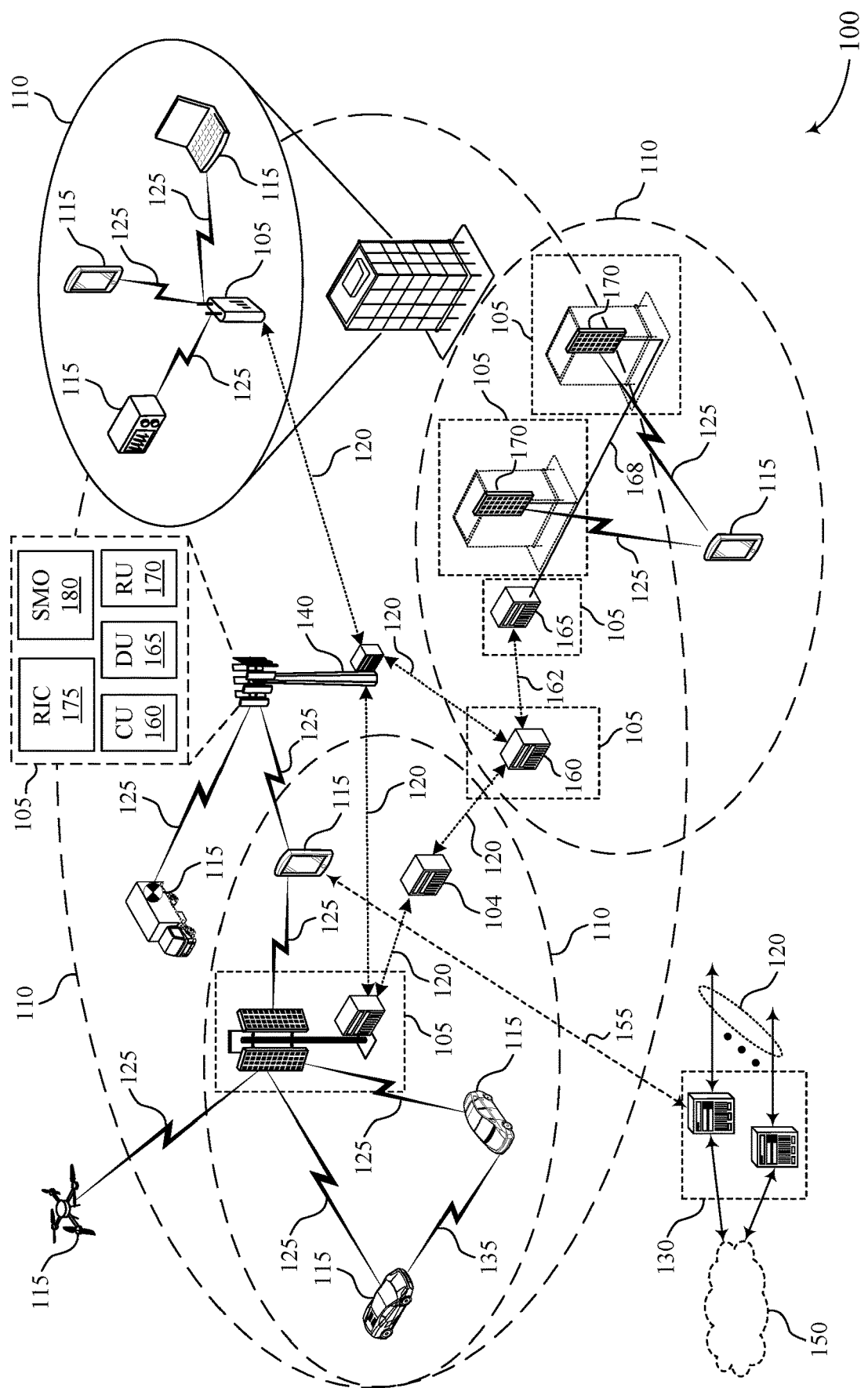
FIG. 1 shows an example of a wireless communications system that supports compression parameter reporting in accordance with one or more aspects of the present disclosure.

Some wireless communications systems and wireless communication devices (e.g., user equipment (UEs), network entities, wearable devices) may support functionalities related to virtual reality (VR), augmented reality (AR), mixed reality (MR) or similar applications which may collectively be referred to as extended reality (XR) applications. Such applications may be supported through the use of one or more XR devices (e.g., XR headsets or other devices each having a quantity of cameras) in communication with a wireless device such as a UE, network entity, a cloud edge processor at a network entity, or the like. For example, in some XR applications, features from real and virtual environments may be overlaid and displayed to a user via an XR device such as an XR headset or goggles.

XR applications may be an emerging use case for sixth generation (6G) communications. To keep XR devices light weight, low power, low cost, processing that would otherwise be performed by the XR device may be offloaded or transferred to another device, which may be at a UE or cloud edge processing at a network entity. For example, an XR device that may otherwise independently perform video compression from its cameras may not utilize statistical dependency between itself and other XR devices and as such to conserve processing power, compression may be offloaded to a device that is enabled to utilize statistical dependency between device fields of view to determine improved compression rates.

As such, the XR device's primary remaining function may be to act as an immersive audio-visual human interface. To enable this prospect, procedures may be defined to decrease the video encoding/decoding/rendering latency and processing overhead at XR devices. One approach may be to have an XR device compress the video it transmits using intra-frames which may conserve power, complexity, or latency associated with inter-frame compression. Additionally, or alternatively, when an XR device has several cameras, it may be simpler to compress each camera separately to reduce complexity and power consumption. Another use case may be when several XR devices share a same UE as a co-processor (e.g., a one-to-many split). In some such examples, the images between the different users may be correlated, but each XR device may not be aware of the correlation with the others.

The described techniques provide for a UE, a network entity, or a cloud processing unit at a network entity to adjust (e.g., control) a video frame compression level (e.g., rate) at an XR device (e.g., XR node) by leveraging a correlation between video frames captured by a first XR node and video frames captured by a second XR node (e.g., captured by two XR headsets or two camera devices collocated at a single XR headset).

XR devices or nodes may be costly and may consume large amounts of resources, thus it may be desirable to streamline operations at these devices. For example, an XR device may perform compression of video frames which may consume larger quantities of resources at the XR device than other processes. Compression may be performed at various levels which consume a corresponding amount of resources (e.g., lower compression rates may consume fewer resources than higher compression rates). As such, a supporting device (e.g., UE, gNB, cloud edge processor) may communicate with one or more XR devices to conserve resources by controlling a level of compression by leveraging a correlation between video frames captured by a first XR node and video frames captured by a second XR node.

In some examples, a UE (or other wireless communications device) may perform an initial connection procedure with two or more XR devices or with a single XR device employing multiple cameras. The UE may receive a quantity of video frames (e.g., compressed using a default compression scheme) from each device or camera and may determine a joint probability distribution function for the video sources. For example, the UE may use the Slepian-Wolf bounds to determine whether the video frames from each source are independent or co-dependent. For example, the UE may estimate the entropy of one of the video sources given the other video source (e.g., based on the Slepian-Wolf bounds).

The UE may determine the correlation between one video source with the other based on the entropy and as such, the UE may determine a level of compression that is appropriate based on the Slepian-Wolf bound of the entropies corresponding to the first set of video frames and the second set of video frames. For example, the UE may estimate a first entropy for the first set of video frames and may estimate a second entropy for the second set of video frames and may estimate how much compression is to be applied to each source view while still maintaining a level of distortion corresponding to an appropriate quality level (e.g., minimum or desired quality level) based on the Slepian-Wolf bound of the estimated entropies. That is, if two video frame sources overlap in information (e.g., correlate), one or more of the sources may be able to perform decreased compression while maintaining a quality level, thereby conserving resources. The UE may determine how compression may be implemented (e.g., decreased) and may transmit a compression level report to one or more of the sources indicating a new compression scheme.

The UE may transmit the compression level report to at least one of the first XR node or the second XR node, or both to indicate the new compression scheme for compression of additional quantities of video frame. The receiving device may transmit a subsequent (e.g., third) quantity of frames to the UE that are compressed according to the new compression scheme. As such, the receiving XR node may conserve resources by utilizing a compression scheme having a lower level of compression and as such, may experience improved compression, lower compression latency, and lower complexity.

Aspects of the disclosure are initially described in the context of wireless communications systems. Aspects of the disclosure are then illustrated in the context of coding procedures and a process flow. Aspects of the disclosure are further illustrated by and described with reference to apparatus diagrams, system diagrams, and flowcharts that relate to compression parameter reporting.

FIG. 1 shows an example of a wireless communications system 100 that supports compression parameter reporting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support compression parameter reporting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support functionalities related to VR, AR, or similar applications which may collectively be referred to as XR applications. Such applications may be supported through the use of one or more XR devices (e.g., XR headsets or other devices each having a quantity of cameras) in communication with a wireless device such as a UE 115, network entity 105, a C-RAN, or the like.

A UE 115 (or a network entity 105, or a C-RAN) may receive, from a first source device (e.g., a first camera or other recording device at an XR device, a first XR device, a first XR node), a first quantity of frames that may be compressed in accordance with a first compression scheme and may receive, from a second source device (e.g., a second camera or other recording device at the XR device, a second XR device, a second XR node), a second quantity of frames that may be compressed in accordance with the first compression scheme. In some examples, the first quantity of frames may be representative of first content recorded by the first source device and the second quantity of frames may be representative of second content recorded by the second source device. The UE 115 (or a network entity 105, or a C-RAN) may transmit, to at least the first source device, a compression level report that indicates a second compression scheme for compression of additional quantities of frames from the first source device. In some examples, the second compression scheme may be associated with reduced processing with respect to processing associated with the first compression scheme. In some examples, the reduced processing may be based on a correlation between the first content of the first quantity of frames and the second content of the second quantity of frames.

The receiving XR node may transmit, to the UE 115 (or the network entity 105, or the C-RAN), a third quantity of frames that may be compressed in accordance with the second compression scheme. In some examples, the third quantity of frames may be representative of third content recorded by the first source device.

Figure 2A:
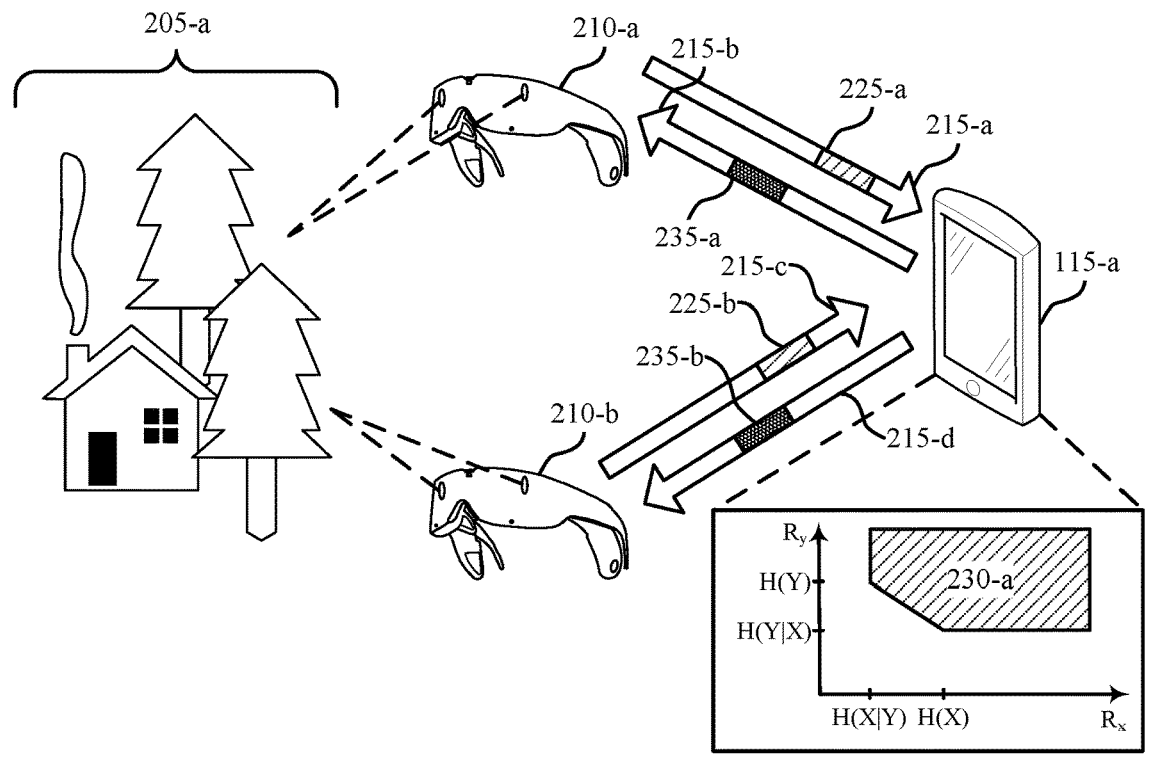
FIGS. 2A & 2B each show an example of a wireless communications system that supports compression parameter reporting in accordance with one or more aspects of the present disclosure.

FIG. 2A shows an example of a wireless communications system 201 that supports compression parameter reporting in accordance with one or more aspects of the present disclosure. The wireless communications system 201 may include a first XR device 210-*a*, a second XR device 210-*b*, and a UE 115-*a* which may be an example of the corresponding device as described with reference to FIG. 1. It is to be noted that although wireless communications system 201 depicts procedures between a UE 115 and XR devices 210-*a* and 210-*b*, the procedures described herein may be performed between any other wireless device connected with the XR devices 210-*a* and 210-*b*, such as a network entity 105 or a C-RAN as described with reference to FIG. 1. Wireless communications system 201 may illustrate procedures between a UE 115 and two XR devices 210.

Figure 2B:
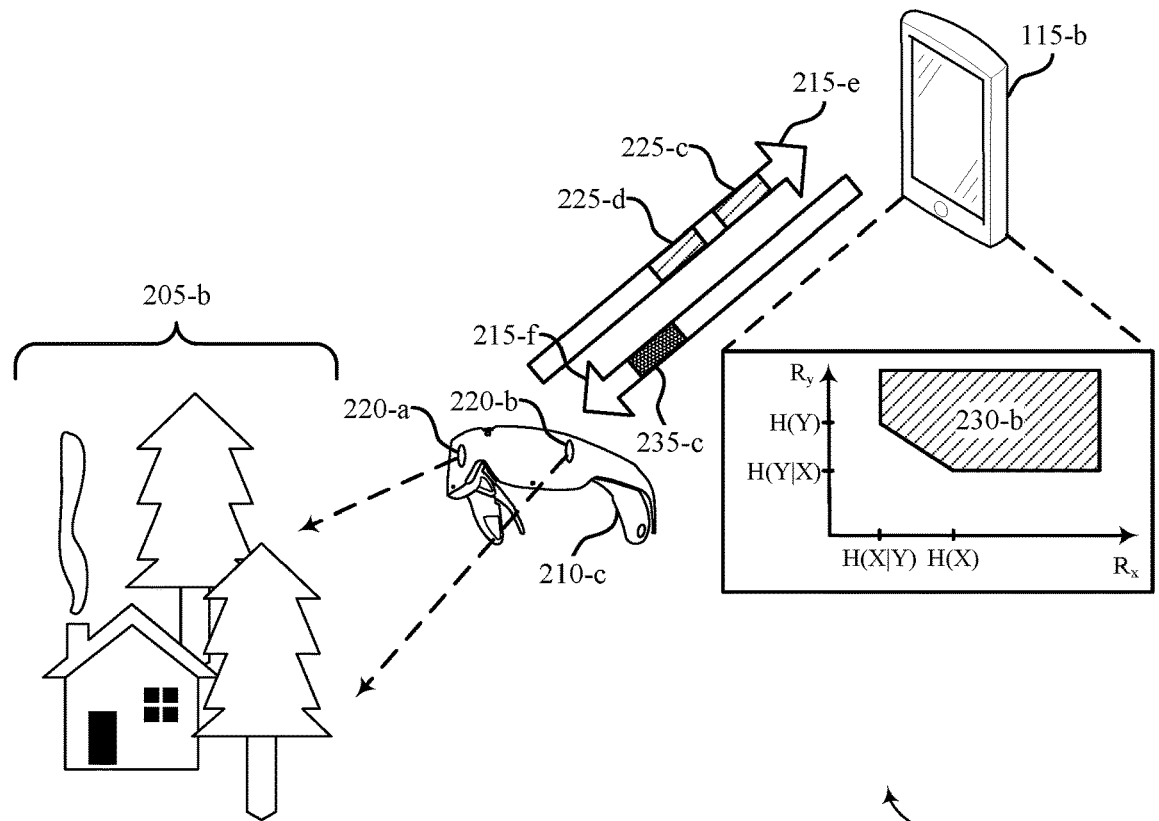

FIG. 2B shows an example of a wireless communications system 202 that supports compression parameter reporting in accordance with one or more aspects of the present disclosure. The wireless communications system 202 may include an XR device 210-*c* including recording devices (e.g., cameras) 220-*a* and 220-*b*, and a UE 115-*b* which may be an example of the corresponding device as described with reference to FIG. 1. It is to be noted that although wireless communications system 202 depicts procedures between a UE 115 and an XR device 210-*c*, the procedures described herein may be performed between any other wireless device connected the XR devices 210, such as a network entity 105 or a C-RAN, as described with reference to FIG. 1. Wireless communications system 202 may illustrate procedures between a UE 115 and a single XR device 210-*c* having multiple XR nodes (e.g., recording devices 220-*a* and 220-*b*).

For example, with reference to FIG. 2A, the UE 115-*a* may perform a connection procedure with first XR device 210-*a* to establish communication links 215-*a* and 215-*b* and may perform a connection procedure with second XR device 210-*b* to establish communication links 215-*c* and 215-*d*. In some examples, the initial connection procedure may configure one or more parameters at one or more of the UE 115-*a*, the first XR device 210-*a*, or the second XR device 210-*b* such as a channel waveform, video resolution, and bandwidth allocation, among other examples. The first XR device 210-*a* may record a first set of video frames of source image 205-*a* and may use an initial compression scheme (e.g., an initial PHY level compression scheme (e.g., deep video compression, distributed video coding, discrete cosine transform, discrete wavelet transform, discrete cosine transform decimation, MPEG2, MPEG4, H.264, DivX, and VC1, or the like)) to compress the first set of video frames. The first XR device 210-*a* may transmit the compressed video frames 225-*a* via communication link 215-*a* to the UE 115-*a*. Similarly, the second XR device 210-*b* may record a second set of video frames of source image 205-*a* and may use the same initial compression scheme or a different initial compression scheme (e.g., deep video compression, distributed video coding, discrete cosine transform, discrete wavelet transform, discrete cosine transform decimation, MPEG2, MPEG4, H.264, DivX, and VC1, or the like)) than the first XR device 210-*a* to compress the second set of video frames. The second XR device 210-*b* may transmit the compressed video frames 225-*b* via communication link 215-*c* to the UE 115-*a*.

The UE 115-*a* may receive the first set of video frames and the second set of video frames and may determine a correlation between the first set of video frames and the second set of video frames, where the correlation is representative of viewpoints of the source image 205-a in which the first set of video frames and the second set of video frames overlap given that XR devices 210-a and 210-b are viewing a same source image 205-a. That is, some portion of the first set of video frames and the second set of video frames may include a same portion of the source image 205-a, however, some portion of the first set of video frames and the second set of video frames may differ given the different viewpoints of the XR devices 210-a and 210-b due to having different physical locations.

For example, the UE 115-a may estimate a joint probability distribution function (PDF) between the first set of video frame and the second set of video frames and may estimate an entropy of the first set of video frames (e.g., $H(XR_1)$), the second set of video frames (e.g., $H(XR_2)$), the first set of video frames given the second set of video frames (e.g., $H(XR_1|XR_2)$), an entropy of the second set of video frames given the first set of video frames (e.g., $H(XR_2|XR_1)$)), and a joint entropy of the first set of video frames and the second set of videos frames (e.g., $H(XR_1, XR_2)$), or any combination thereof, where H is the entropy function.

The UE 115-a may use the estimated joint PDF between the first XR device 210-a and the second XR device 210-b, the estimated entropies, and a UE 115-a implementation of the joint decoding (e.g., the UE 115-a may decode both $XR_1$ and $XR_2$ together because of the correlation between $XR_1$ and $XR_2$ or may decode $XR_1$ and $XR_2$ separately), to determine a new compression scheme for at least one of the first XR device 210-a and the second XR device 210-b. For example, the UE 115-a may determine Slepian Wolf bounds for a set of achievable compression rates 230-a (e.g., coding rates) based on the estimated entropies and may select an achievable compression rate (e.g., $R_x$, $R_y$, or both) that maintains or exceeds an appropriate level of video quality while reducing compression processing of at least one of the first XR device 210-a or the second XR device 210-b, or both with respect to the initial compression scheme. The UE 115-a may transmit a compression level report 235 indicating the new compression scheme selected from the set of achievable compression rates 230-a.

For example: the UE 115-a may select a new $R_x$ and a new $R_y$, and may transmit both compression level reports 235-a and 235-b; the UE 115-a may select a new $R_x$, but not a new $R_y$, and may transmit compression level report 235-a; or the UE 115-a may select a new $R_y$, but not a new $R_x$ and may transmit compression level report 235-b. In some examples, the compression level report 235-a, 235-b, or both may indicate a reduction in compression that may be applied which may reduce power consumption or latency, or both at the corresponding XR device 210-a or 210-b, or both.

With reference to FIG. 2B, the UE 115-b may perform a connection procedure with XR device 210-c to establish communication links 215-e and 215-f. In some examples, the initial connection procedure may configure one or more parameters at one or more of the UE 115-b, the XR device 210-c, the recording device 220-a, and the recording device 220-b such as a channel waveform, video resolution, and bandwidth allocation, among other examples. The recording device 220-a may record a first set of video frames of source image 205-b and the recording device 220-b may record a second set of video frames of source image 205-b. The XR device 210-c may use an initial compression scheme (e.g., an initial PHY level compression scheme (e.g., deep video compression, distributed video coding, discrete cosine transform, discrete wavelet transform, discrete cosine transform decimation, MPEG2, MPEG4, H.264, DivX, and VC1, or the like)) to compress the first set of video frames, the second set of video frames, or both. The XR device 210-c may transmit the compressed video frames 225-c and 225-d via communication link 215-e to the UE 115-b (e.g., via a single message or via multiple messages).

The UE 115-b may receive the first set of video frames and the second set of video frames and may determine a correlation between the first set of video frames and the second set of video frames, where the correlation is representative of viewpoints of the source image 205-b in which the first set of video frames and the second set of video frames overlap given that recording devices 220-a and 220-b are viewing a same source image 205-b. That is, some portion of the first set of video frames and the second set of video frames may include a same portion of the source image 205-b, however, some portion of the first set of video frames and the second set of video frames may differ given the different viewpoints of the recording devices 220-a and 220-b due to having different physical locations on the XR device 210-c.

For example, the UE 115-b may estimate a joint probability distribution function (PDF) between the first set of video frame and the second set of video frames and may estimate an entropy of the first set of video frames (e.g., $H(XR_1)$), the second set of video frames (e.g., $H(XR_2)$), the first set of video frames given the second set of video frames (e.g., $H(XR_1|XR_2)$), and an entropy of the second set of video frames given the first set of video frames (e.g., $H(XR_2|XR_1)$)), or any combination thereof, where H is the entropy function.

The UE 115-b may use the estimated joint PDF between the recording device 220-a and the recording device 220-b, the estimated entropies, and a UE 115-b implementation of the joint decoding (e.g., the UE 115-b may decode both $XR_1$ and $XR_2$ together because of the correlation between $XR_1$ and $XR_2$ or may decode $XR_1$ and $XR_2$ separately), to determine a new compression scheme for video frames recorded by the recording device 220-a, or the recording device 220-b, or both. For example, the UE 115-b may determine Slepian Wolf bounds for a set of achievable compression rates 230-b (e.g., coding rates) based on the estimated entropies and may select an achievable compression rate (e.g., $R_x$, $R_y$, or both) that maintains or exceeds an appropriate level of video quality while reducing compression processing for video frames recorded by the recording device 220-a or the recording device 220-b, or both with respect to the initial compression scheme. The UE 115-b may transmit a compression level report 235-c indicating the new compression scheme selected from the set of achievable compression rates 230-b.

For example: the compression level report 235-c may indicate a new $R_x$ and a new $R_y$; the compression level report 235-c may indicate a new $R_x$, but not a new $R_y$; or the compression level report 235-c may indicate a new $R_y$, but not a new $R_x$. In some examples, the compression level report 235-c may indicate a reduction in compression that may be applied to either or both sets of video frames recorded by the recording devices 220 which may reduce power consumption or latency, or both at the XR device 210-c.

With respect to wireless communications systems 201 and 202, the compression level report 235 may include or indicate one or more of: a reduced compression bit rate which respect to a change in bits per second (e.g., Δ bits/sec) which may be a general indication that is applicable to various encoding or compression schemes; a change in DCT decimation rate used for compression; a change in LDPC coding rate (e.g., or in general the channel coding rate) where the source and the channel codes may be likely to be decoded together for improved performance because the decoding may be performed on the PHY level; one or more parameters or details of the PDF and the estimated entropies (e.g., any combination of $H(XR_1)$, $H(XR_2)$, $H(XR_1|XR_2)$, $H(XR_2|XR_1)$, the joint PDF estimated by the UE 115, a quantity M first moments of distribution, or piece-wise linear parameters of distribution) such that the receiving XR device 210 may switch compression rates or implement changes to its compression rate (e.g., autonomously), in some examples, according to any relevant XR device-specific implementations.

Figure 3A:
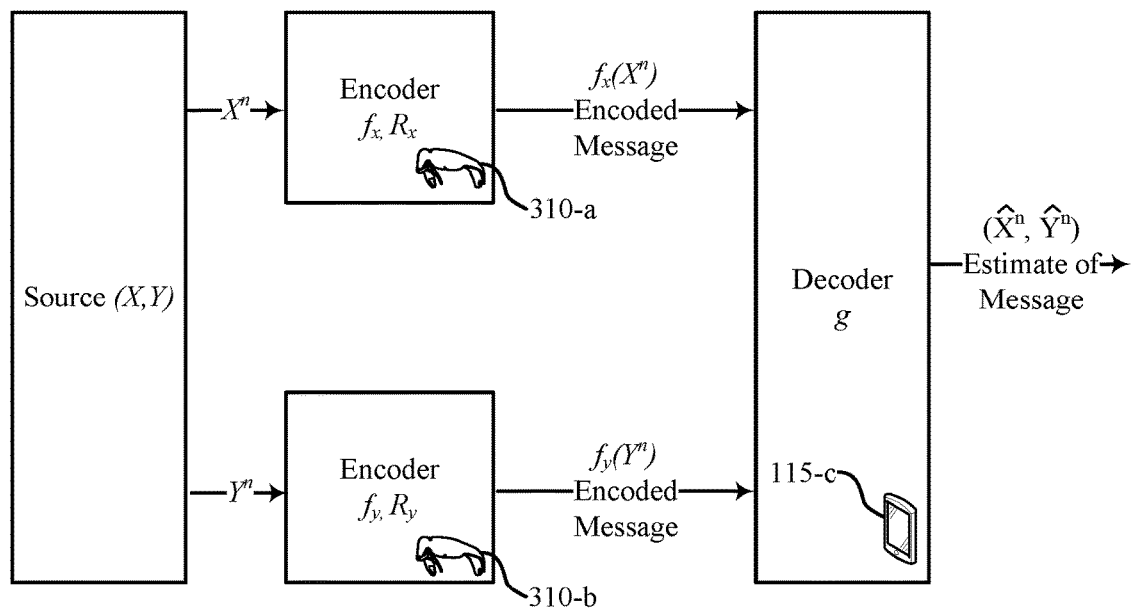
FIGS. 3A & 3B each show an example of a coding procedure that supports compression parameter reporting in accordance with one or more aspects of the present disclosure.
Figure 3B:
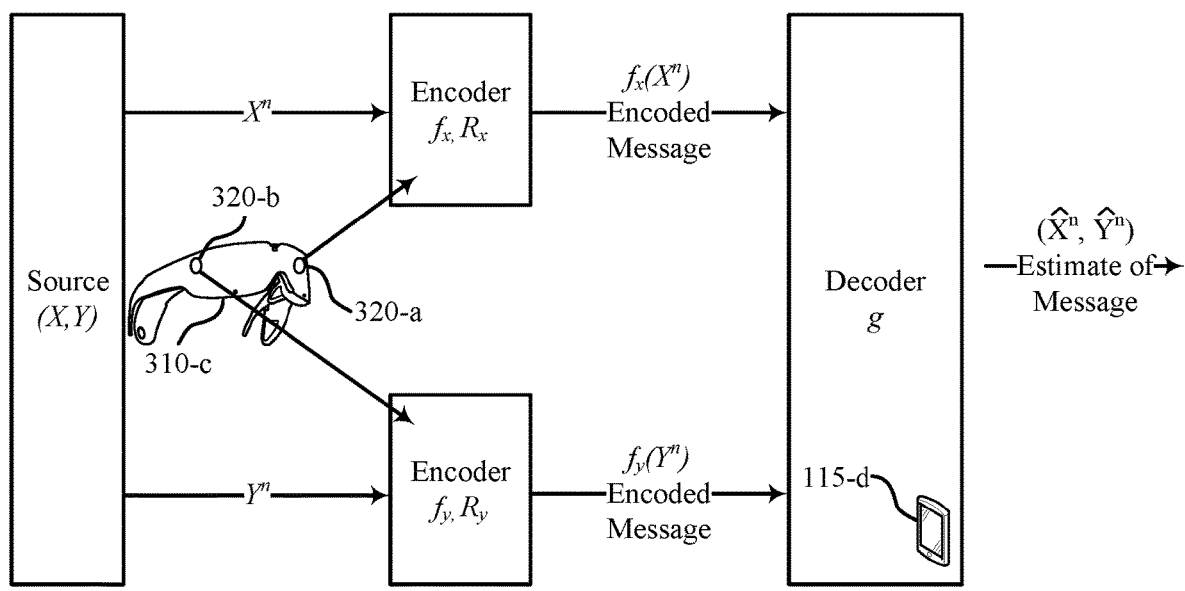

FIGS. 3A & 3B shows examples of a coding procedures 301 & 302 that support compression parameter reporting in accordance with one or more aspects of the present disclosure. Coding procedures 301 and 302 may each illustrate examples of distributed source coding, in particular, Slepian-Wolf coding for the coding of two or more dependent sources with separate encoders and a joint decoder. For example, given two statistically dependent independent and identically distributed finite-alphabet random sequences $X_n$ and $Y_n$ (e.g., the first and second set of video frames), the Slepian-Wolf theorem gives a theoretical bound for the lossless coding rate for distributed coding of the two sequences (e.g., sources).

The bound for lossless coding rates may be: $R_x \geq H(X|Y)$, $R_y \geq (H(Y|X)$, $R_x + R_y \geq H(X,Y)$, where $R_x$ is the coding rate for the first set of video frames as described herein, $R_y$ is the coding rate for the second set of video frames as described herein, H(X|Y) is the entropy of the first set of video frames given the second set of video frames, and (H(Y|X) is the entropy of the second set of video frames given the first set of video frames. If both the encoder and the decoder of the two set of video frames are independent, the lowest rate it can achieve for lossless compression is H(x) (e.g., the entropy of the first set of video frames) and H(y) (e.g., the entropy of the second set of video frames) for X (e.g., the first set of video frames) and Y (e.g., the first set of video frames), respectively. However, with joint decoding, if vanishing error probability for long sequences is accepted, the Slepian-Wolf theorem shows that a better compression rate may be achieved With respect to coding procedure 301, in this example, several XR devices 310-a and 310-b may utilize the wireless device (e.g., UE 115-c, network entity 105, C-RAN) to offload processing. This conserve cost and power consumption at the XR device. In this scenario it may be the case that both XR devices are in relatively close spatial proximity and thus may share at least a portion of their field of view. The XR devices themselves may not be capable or enabled to determine this correlation and as such, the XR device 310-a may compress the camera output $X^n$ using a compression rate $R_x$ and may transmit the encoded message $f_x(X^n)$ to the UE 115-c and the XR device 310-b may compress the camera output $Y^n$ using a compression rate $R_y$ and may transmit the encoded message $f_y(Y^n)$ to the UE 115-c. As such, each XR 310 device may compress a corresponding camera output (e.g., set of video frames) independently.

The UE 115-c may estimate H(X|Y) and H(Y|X) and may estimate an appropriate level of compression for improving resource use while maintaining a level of visual and communication quality (e.g., keeping a required or minimum distortion level). The estimation of the entropy of the sources may be complex and, in some examples, may utilize machine learning techniques. The UE 115-c may report back to the XR devices 310-a and 310-b, a possible change in compression rate which may save processing that would otherwise be used for this extra compression (e.g., video compression like H264 may be very complex and utilize heavy processing which may use large data double rates).

With respect to coding procedure 302, in this example, a single XR device 310-c may utilize the wireless device (e.g., UE 115-d, network entity 105, C-RAN) to offload processing of multiple camera views for cost and power consumption conservation. In this example, the XR device 310-c may include has multiple cameras 320 to provide multiple fields of view for depth perception and overall better user experience. Although, the XR device 310-c may share information between cameras 320-a and 320-b, this may introduce extra complexity and possibly extra latency. XR applications may be sensitive to latency effects. For example, camera 320-a may be denoted by X and the camera 320-b may be denoted as Y. The UE 115-d can estimate H(X|Y) and H(Y|X) an appropriate level of compression for improving resource use while maintaining a level of visual and communication quality (e.g., keeping a required or minimum distortion level). The estimation of the entropy of the sources may very complex and may utilize machine learning techniques.

The UE 115-d may report back to the XR device 310-c, a possible change in compression rate which may save processing that would otherwise be used for this extra compression (e.g., video compression like H264 may be very complex and utilize heavy processing which may use large data double rates).

Figure 4:
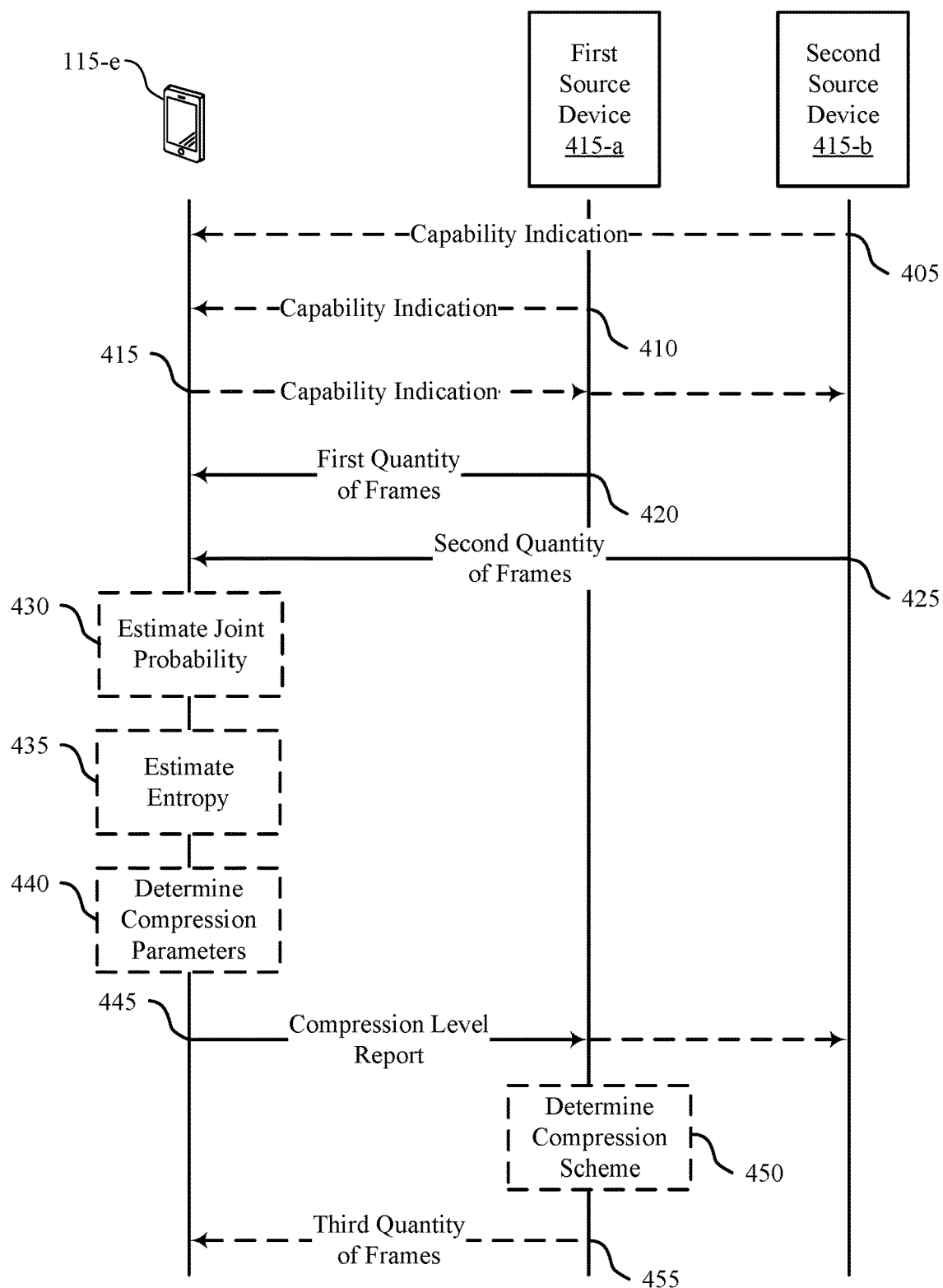
FIG. 4 shows an example of a process flow that supports compression parameter reporting in accordance with one or more aspects of the present disclosure.

FIG. 4 shows an example of a process flow 400 that supports compression parameter reporting in accordance with one or more aspects of the present disclosure. In some examples, the process flow 400 may implement or be implemented by aspects of the wireless communications system 100, the wireless communications system 201, the wireless communications system 202, the coding procedure 301, and the coding procedure 302. For example, the process flow 400 may include a UE 115-e (e.g., which may be an example of the corresponding device as described with reference to FIGS. 1, 2A, 2B, 3A, and 3B), a first source device 415-a, and a second source device 415-b each of which may be an example of an XR device or a recording device at an XR device which may be examples of the corresponding devices as described with reference to FIGS. 2A, 2B, 3A, and 3B.

For example, the first source device 415-a and the second source device 415-b may each comprise an XR device each having at least one camera or the first source device 415-a and the second source device 415-b may each comprise a camera of an XR device. While the operations are described as occurring between the UE 115-e and the source devices 415, the operations may be performed by any device in any order and one or more operations may be added or omitted from the operations. For example, any operation performed by the UE 115-e may be performed instead by a network entity or a C-RAN as described with reference to FIG. 1 or a cloud edge processing unit at a network entity.

In some example implementations, at 405 and 410, the UE 115-e may receive, from the first source device 415-a, the second source device 415-b, or both, a capability message that indicates a corresponding source device is enabled to switch from processing video frames in accordance with the first compression scheme to processing video frames in accordance with a different compression scheme.

Additionally, or alternatively, in some examples implementations, at 415, the UE 115-*e* may transmit, to the first source device 415-*a* and the second source device 415-*b*, a capability message that indicates the UE 115-*e* is enabled to perform compression level determination and reporting.

At 420, the UE 115-*e* may receive, from the first source device 415-*a*, a first quantity of frames that are compressed in accordance with a first compression scheme, the first quantity of frames representative of first content recorded by the first source device 415-*a*.

At 425, the UE 115-*e* may receive, from the second source device 415-*b*, a second quantity of frames that are compressed in accordance with the first compression scheme, the second quantity of frames representative of second content recorded by the second source device.

At 430, the UE 115-*e* may estimate a joint PDF associated with the first quantity of frames and the second quantity of frames and at 435, may estimate one or more first entropies associated with the first quantity of frames and one or more second entropies associated with the second quantity of frames, where the correlation is based on one or more of the joint PDF, the one or more first entropies, and the one or more second entropies.

At 440, the UE 115-*e* may determine a set of compression parameters for the second compression scheme for the compression of the additional quantities of frames from at least the first source device 415-*a*, wherein the compression level report comprises an indication of the set of compression parameters.

At 445, the UE 115-*e* may transmit, to at least the first source device 415-*a*, a compression level report that indicates a second compression scheme for compression of additional quantities of frames from the first source device 415-*a*, wherein the second compression scheme is associated with reduced processing with respect to processing associated with the first compression scheme. In some examples, the reduced processing may be based on a correlation between the first content of the first quantity of frames and the second content of the second quantity of frames (e.g., an overlap in fields of view of the first source device 415-*a* and the second source device 415-*b*). In some examples, the second compression scheme indicates a change in bit rate, discrete cosine transform decimation rate, error correcting coding rate, or any combination thereof, with respect to the first compression scheme At 450, the first source device 415-*a* may determine the second compression scheme based on a capability of the first source device and the compression level report.

At 455, the first source device 415-*a* may transmit, to the wireless communications device, a third quantity of frames that are compressed in accordance with the second compression scheme, the third quantity of frames representative of third content recorded by the first source device. In some examples, transmitting the third quantity of frames processed in accordance with the second compression scheme is based at least in part on determining the second compression scheme at 450.

Figure 5:
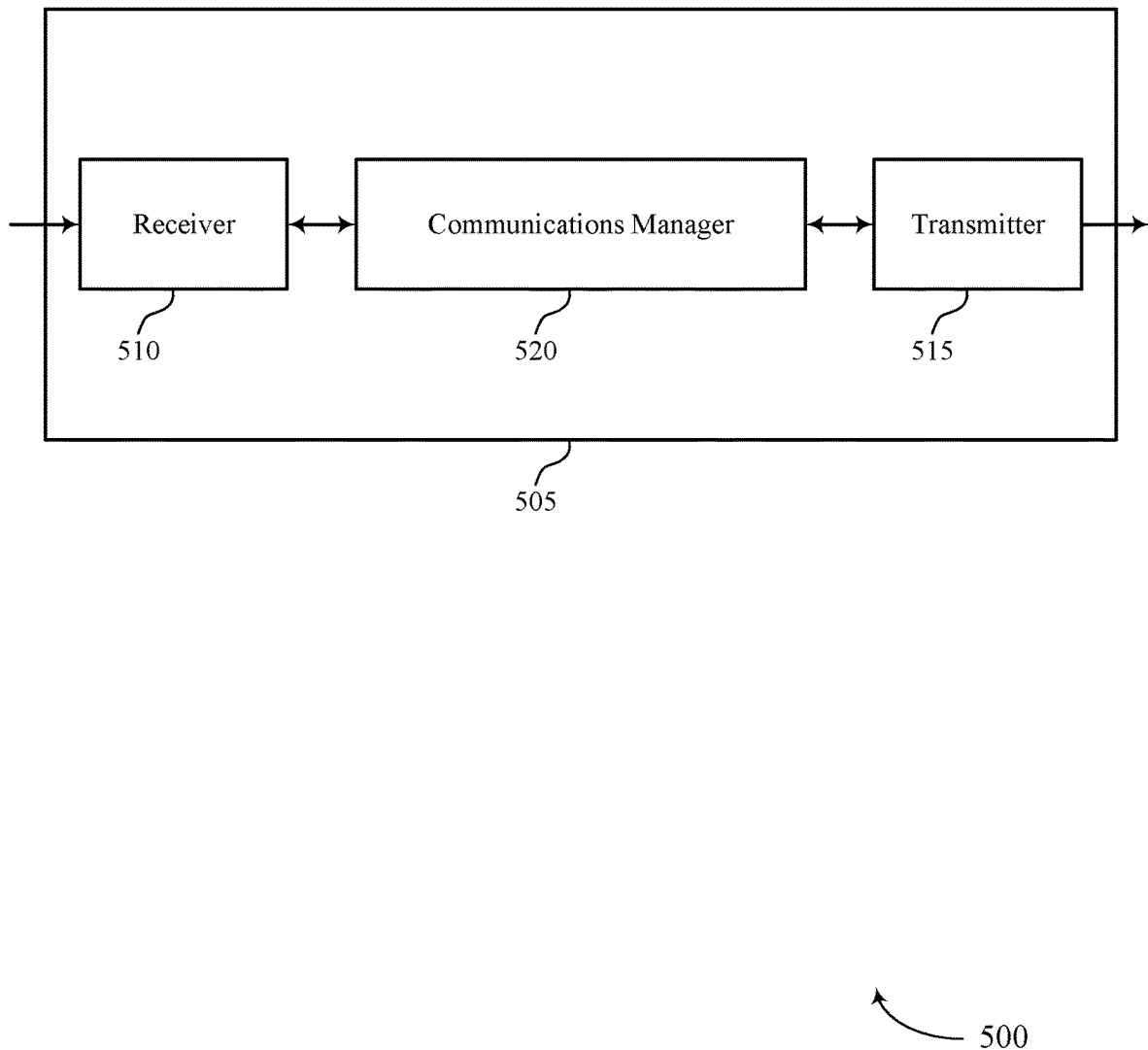
FIGS. 5 and 6 show block diagrams of devices that support compression parameter reporting in accordance with one or more aspects of the present disclosure.

FIG. 5 shows a block diagram 500 of a device 505 that supports compression parameter reporting in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to compression parameter reporting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to compression parameter reporting). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of compression parameter reporting as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a wireless communications device in accordance with examples as disclosed herein. For example, the communications manager 520 may be configured as or otherwise support a means for receiving, from a first source device, a first quantity of frames that are compressed in accordance with a first compression scheme, the first quantity of frames representative of first content recorded by the first source device. The communications manager 520 may be configured as or otherwise support a means for receiving, from a second source device, a second quantity of frames that are compressed in accordance with the first compression scheme, the second quantity of frames representative of second content recorded by the second source device. The communications manager 520 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

Additionally, or alternatively, the communications manager 520 may support wireless communication at a first source device in accordance with examples as disclosed herein. For example, the communications manager 520 may be configured as or otherwise support a means for transmitting, to a wireless communications device, a first quantity of frames that are compressed in accordance with a first compression scheme, the first quantity of frames representative of first content recorded by the first source device. The communications manager 520 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The communications manager 520 may be configured as or otherwise support a means for transmitting, to the wireless communications device, a third quantity of frames that are compressed in accordance with the second compression scheme, the third quantity of frames representative of third content recorded by the first source device.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing, reduced power consumption, and higher throughput, among other examples.

Figure 6:
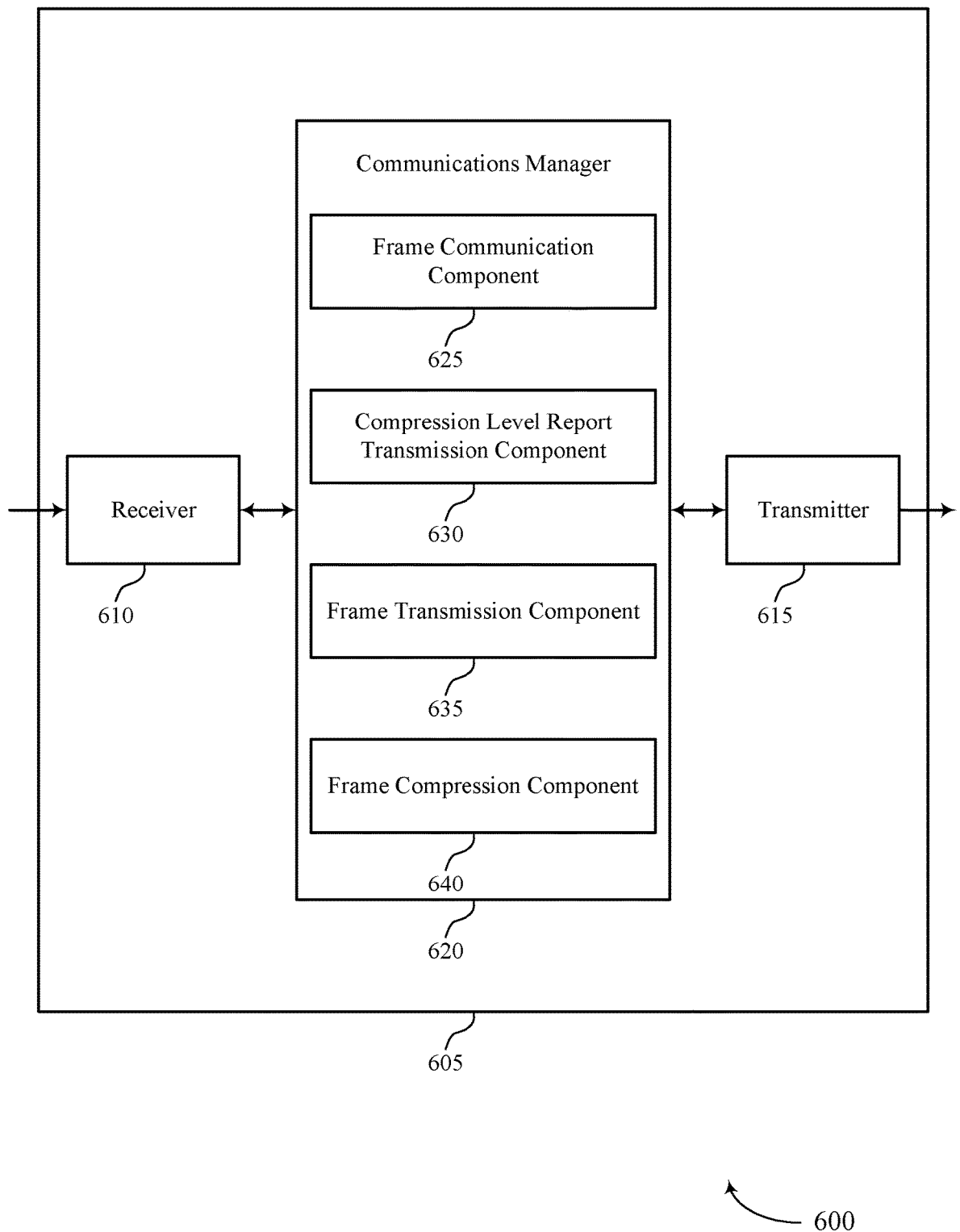

FIG. 6 shows a block diagram 600 of a device 605 that supports compression parameter reporting in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to compression parameter reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to compression parameter reporting). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of compression parameter reporting as described herein. For example, the communications manager 620 may include a frame communication component 625, a compression level report transmission component 630, a frame transmission component 635, a frame compression component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a wireless communications device in accordance with examples as disclosed herein. The frame communication component 625 may be configured as or otherwise support a means for receiving, from a first source device, a first quantity of frames that are compressed in accordance with a first compression scheme, the first quantity of frames representative of first content recorded by the first source device. The frame communication component 625 may be configured as or otherwise support a means for receiving, from a second source device, a second quantity of frames that are compressed in accordance with the first compression scheme, the second quantity of frames representative of second content recorded by the second source device. The compression level report transmission component 630 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

Additionally, or alternatively, the communications manager 620 may support wireless communication at a first source device in accordance with examples as disclosed herein. The frame transmission component 635 may be configured as or otherwise support a means for transmitting, to a wireless communications device, a first quantity of frames that are compressed in accordance with a first compression scheme, the first quantity of frames representative of first content recorded by the first source device. The frame compression component 640 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The frame transmission component 635 may be configured as or otherwise support a means for transmitting, to the wireless communications device, a third quantity of frames that are compressed in accordance with the second compression scheme, the third quantity of frames representative of third content recorded by the first source device.

Figure 7:
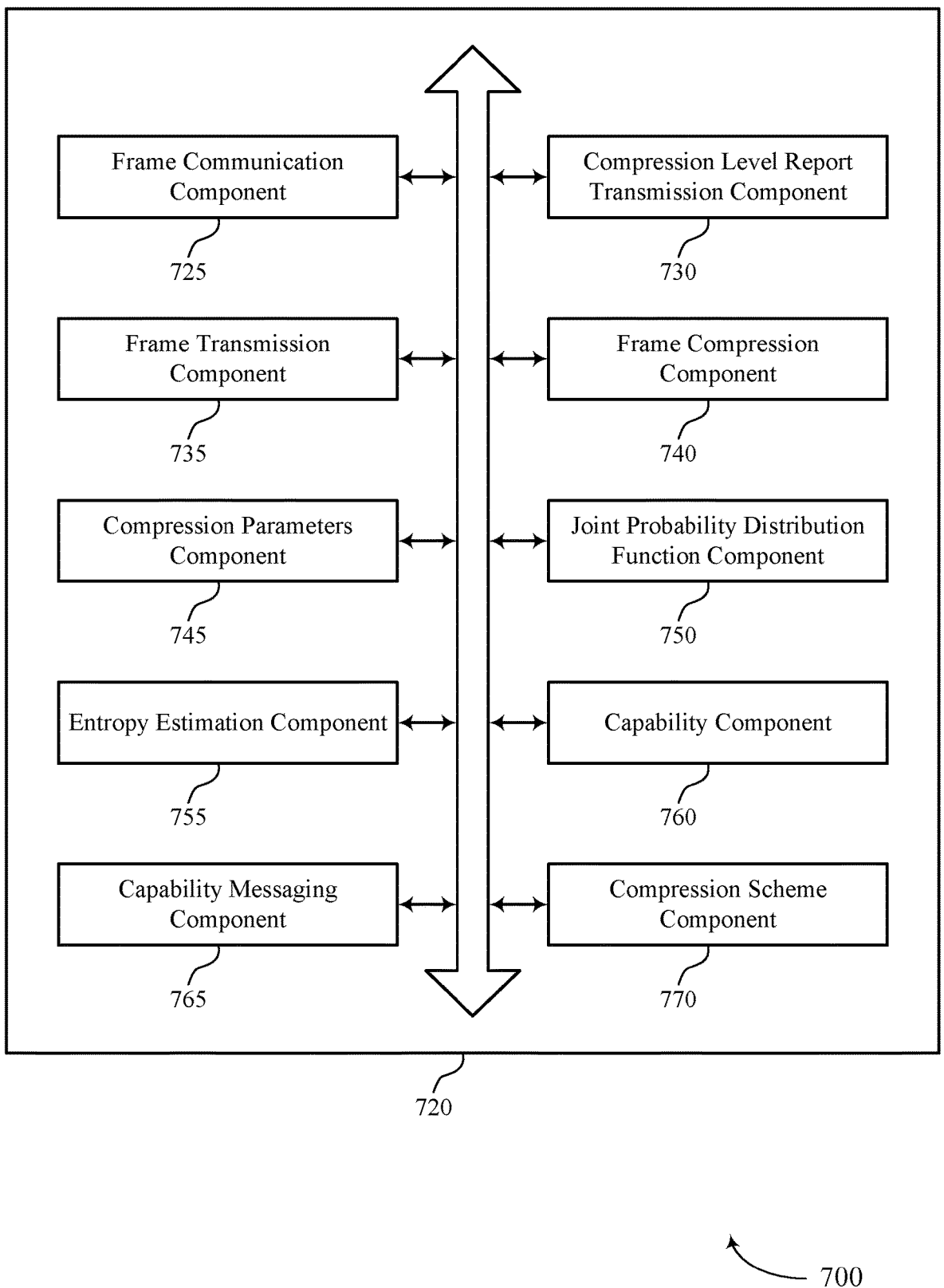
FIG. 7 shows a block diagram of a communications manager that supports compression parameter reporting in accordance with one or more aspects of the present disclosure.

FIG. 7 shows a block diagram 700 of a communications manager 720 that supports compression parameter reporting in accordance with one or more aspects of the present disclosure. The communications manager 720 may be an example of aspects of a communications manager 520, a communications manager 620, or both, as described herein. The communications manager 720, or various components thereof, may be an example of means for performing various aspects of compression parameter reporting as described herein. For example, the communications manager 720 may include a frame communication component 725, a compression level report transmission component 730, a frame transmission component 735, a frame compression component 740, a compression parameters component 745, a joint probability distribution function component 750, an entropy estimation component 755, a capability component 760, a capability messaging component 765, a compression scheme component 770, or any combination thereof. Each of these components may communicate, directly or indirectly, with one another (e.g., via one or more buses).

The communications manager 720 may support wireless communication at a wireless communications device in accordance with examples as disclosed herein. The frame communication component 725 may be configured as or otherwise support a means for receiving, from a first source device, a first quantity of frames that are compressed in accordance with a first compression scheme, the first quantity of frames representative of first content recorded by the first source device. In some examples, the frame communication component 725 may be configured as or otherwise support a means for receiving, from a second source device, a second quantity of frames that are compressed in accordance with the first compression scheme, the second quantity of frames representative of second content recorded by the second source device. The compression level report transmission component 730 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

In some examples, the compression parameters component 745 may be configured as or otherwise support a means for determining a set of compression parameters for the second compression scheme for the compression of the additional quantities of frames from first source device, where the compression level report includes an indication of the set of compression parameters.

In some examples, the joint probability distribution function component 750 may be configured as or otherwise support a means for estimating a joint probability distribution function associated with the first quantity of frames and the second quantity of frames. In some examples, the entropy estimation component 755 may be configured as or otherwise support a means for estimating a first entropy associated with the first quantity of frames and a second entropy associated with the second quantity of frames, where the correlation is based on one or more of the joint probability distribution function, the first entropy, and the second entropy.

In some examples, the compression level report includes one or more of the joint probability distribution function, and the frame communication component 725 may be configured as or otherwise support a means for receiving a third quantity of frames that are compressed in accordance with a third compression scheme, the third quantity of frames representative of third content recorded by the first source device based on the compression level report and a corresponding capability of the first source device.

In some examples, the capability component 760 may be configured as or otherwise support a means for receiving, from the first source device, the second source device, or both, a capability message that indicates a corresponding source device is enabled to switch from processing video frames in accordance with the first compression scheme to processing video frames in accordance with a different compression scheme.

In some examples, the capability messaging component 765 may be configured as or otherwise support a means for transmitting, to the first source device and the second source device, a capability message that indicates the wireless communications device is enabled to determine the correlation between the first content of the first quantity of frames and the second content of the second quantity of frames and transmit the compression level report.

In some examples, the second compression scheme indicates a change in bit rate, discrete cosine transform decimation rate, error correcting coding rate, or any combination thereof, with respect to the first compression scheme.

In some examples, the first source device and the second source device each include an XR device each having at least one camera.

In some examples, the first source device and the second source device each include a camera of an XR device.

In some examples, the wireless communications device includes a UE, a network entity, or a cloud edge processing unit.

Additionally, or alternatively, the communications manager 720 may support wireless communication at a first source device in accordance with examples as disclosed herein. The frame transmission component 735 may be configured as or otherwise support a means for transmitting, to a wireless communications device, a first quantity of frames that are compressed in accordance with a first compression scheme, the first quantity of frames representative of first content recorded by the first source device. The frame compression component 740 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. In some examples, the frame transmission component 735 may be configured as or otherwise support a means for transmitting, to the wireless communications device, a third quantity of frames that are compressed in accordance with the second compression scheme, the third quantity of frames representative of third content recorded by the first source device.

In some examples, the compression level report includes a first set of compression parameters for the first source device, a second set of compression parameters for the second source device, or both.

In some examples, the correlation is determined based on an estimated joint probability distribution function associated with the first quantity of frames and the second quantity of frames, a first entropy associated with the first quantity of frames, and a second entropy associated with the second quantity of frames.

In some examples, the compression level report includes one or more of the estimated joint probability distribution function, and the compression scheme component 770 may be configured as or otherwise support a means for determining the second compression scheme based on a capability of the first source device and the compression level report, where transmitting the third quantity of frames processed in accordance with the second compression scheme is based on the determining.

In some examples, the capability messaging component 765 may be configured as or otherwise support a means for transmitting a capability message that indicates that the first source device is enabled to switch from processing video frames in accordance with the first compression scheme to processing video frames in accordance with a different compression scheme.

In some examples, the capability component 760 may be configured as or otherwise support a means for receiving a capability message that indicates the wireless communications device is enabled to determine the correlation between the first content of the first quantity of frames and the second content of the second quantity of frames and transmit the compression level report.

In some examples, the second compression scheme indicates a change in bit rate, discrete cosine transform decimation rate, error correcting check coding rate, or any combination thereof, with respect to the first compression scheme.

In some examples, the first source device and the second source device each include an XR device each having at least one camera.

In some examples, the first source device and the second source device each include a camera of an XR device.

In some examples, the wireless communications device includes a UE, a network entity, or a cloud edge processing unit.

Figure 8:
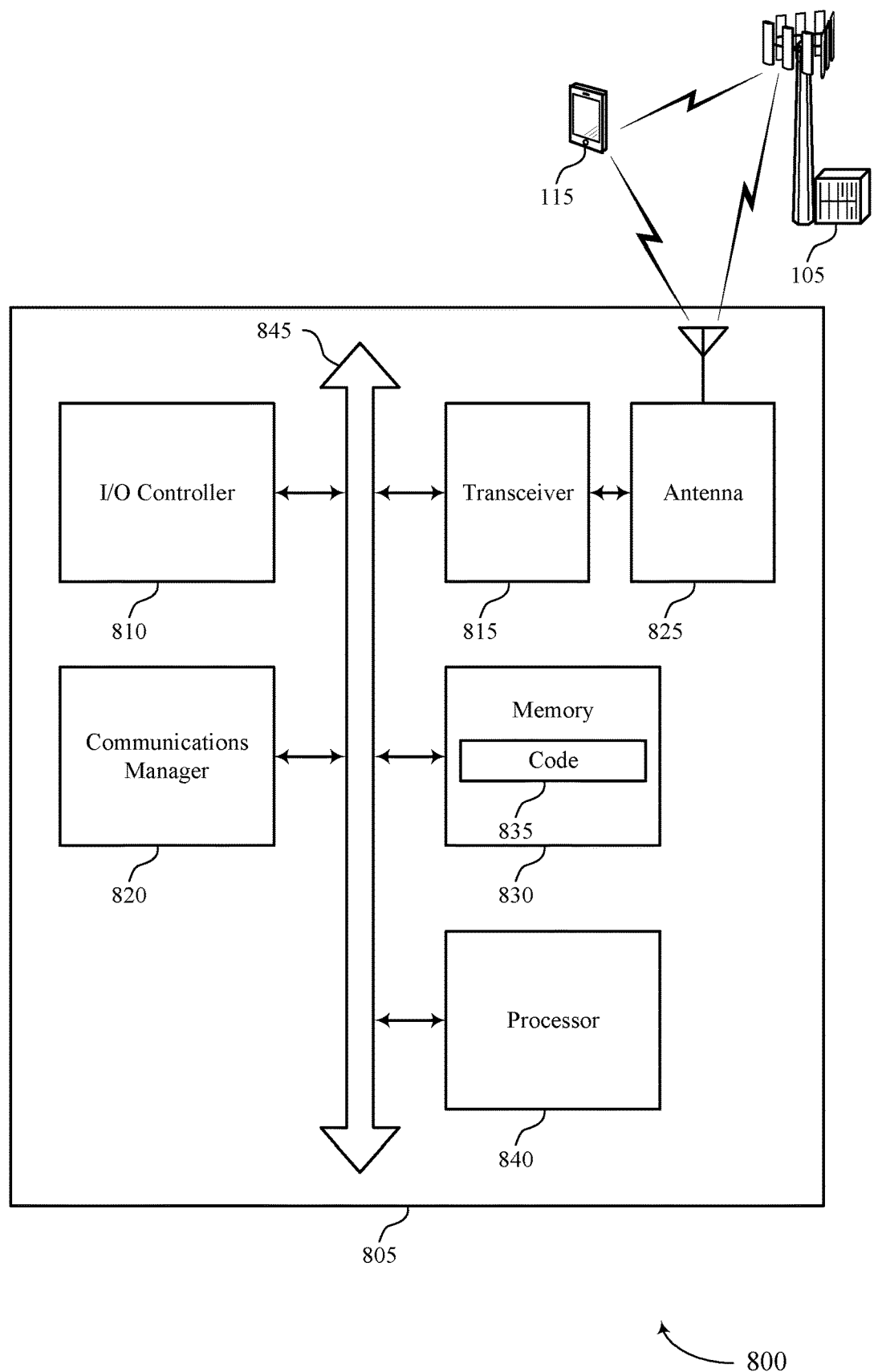
FIG. 8 shows a diagram of a system including a device that supports compression parameter reporting in accordance with one or more aspects of the present disclosure.

FIG. 8 shows a diagram of a system 800 including a device 805 that supports compression parameter reporting in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting compression parameter reporting). For example, the device 805 or a component of the device 805 may include a processor 840 and memory 830 coupled with or to the processor 840, the processor 840 and memory 830 configured to perform various functions described herein.

The communications manager 820 may support wireless communication at a wireless communications device in accordance with examples as disclosed herein. For example, the communications manager 820 may be configured as or otherwise support a means for receiving, from a first source device, a first quantity of frames that are compressed in accordance with a first compression scheme, the first quantity of frames representative of first content recorded by the first source device. The communications manager 820 may be configured as or otherwise support a means for receiving, from a second source device, a second quantity of frames that are compressed in accordance with the first compression scheme, the second quantity of frames representative of second content recorded by the second source device. The communications manager 820 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

Additionally, or alternatively, the communications manager 820 may support wireless communication at a first source device in accordance with examples as disclosed herein. For example, the communications manager 820 may be configured as or otherwise support a means for transmitting, to a wireless communications device, a first quantity of frames that are compressed in accordance with a first compression scheme, the first quantity of frames representative of first content recorded by the first source device. The communications manager 820 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The communications manager 820 may be configured as or otherwise support a means for transmitting, to the wireless communications device, a third quantity of frames that are compressed in accordance with the second compression scheme, the third quantity of frames representative of third content recorded by the first source device.

By including or configuring the communications manager 820 in accordance with examples as described herein, the device 805 may support techniques for improved user experience related to reduced processing, reduced power consumption, improved coordination between devices, longer battery life, improved utilization of processing capability, higher data rates, higher capacity, and higher spectral efficiency, among other examples.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of compression parameter reporting as described herein, or the processor 840 and the memory 830 may be otherwise configured to perform or support such operations.

Figure 9:
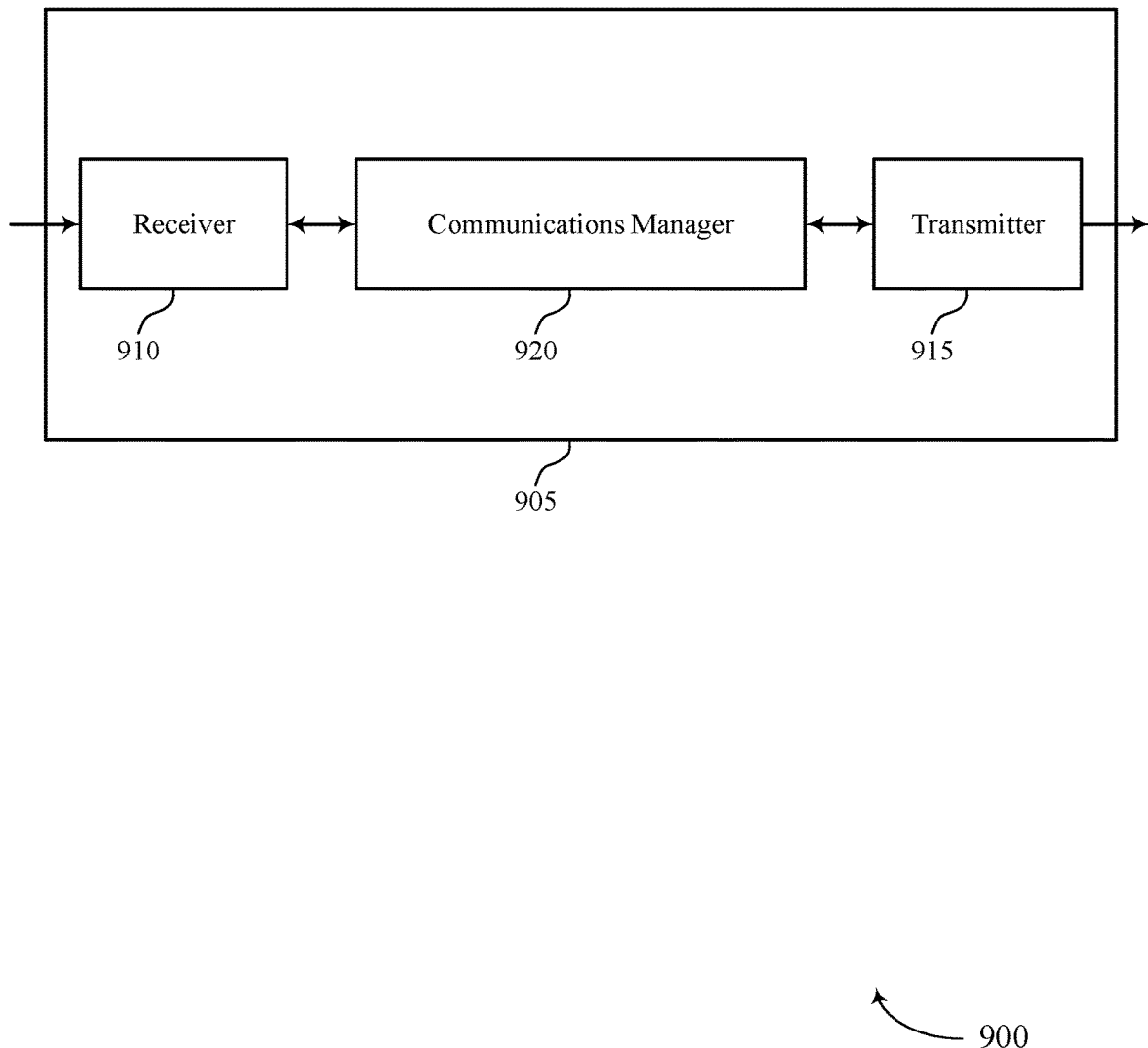
FIGS. 9 and 10 show block diagrams of devices that support compression parameter reporting in accordance with one or more aspects of the present disclosure.

FIG. 9 shows a block diagram 900 of a device 905 that supports compression parameter reporting in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of compression parameter reporting as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a wireless communications device in accordance with examples as disclosed herein. For example, the communications manager 920 may be configured as or otherwise support a means for receiving, from a first source device, a first quantity of frames that are compressed in accordance with a first compression scheme, the first quantity of frames representative of first content recorded by the first source device. The communications manager 920 may be configured as or otherwise support a means for receiving, from a second source device, a second quantity of frames that are compressed in accordance with the first compression scheme, the second quantity of frames representative of second content recorded by the second source device. The communications manager 920 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and higher throughput, among other examples.

Figure 10:
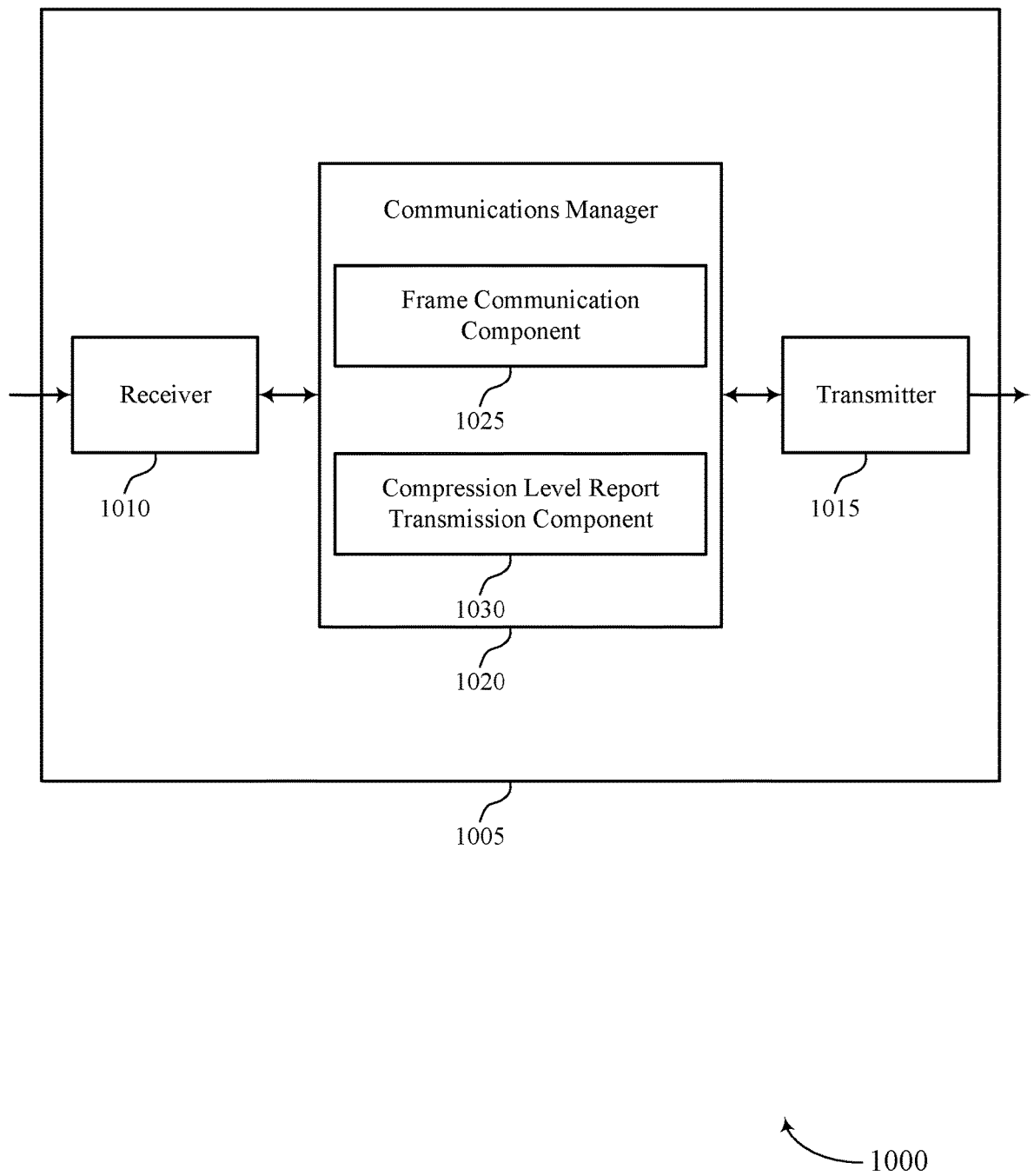

FIG. 10 shows a block diagram 1000 of a device 1005 that supports compression parameter reporting in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of compression parameter reporting as described herein. For example, the communications manager 1020 may include a frame communication component 1025 a compression level report transmission component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a wireless communications device in accordance with examples as disclosed herein. The frame communication component 1025 may be configured as or otherwise support a means for receiving, from a first source device, a first quantity of frames that are compressed in accordance with a first compression scheme, the first quantity of frames representative of first content recorded by the first source device. The frame communication component 1025 may be configured as or otherwise support a means for receiving, from a second source device, a second quantity of frames that are compressed in accordance with the first compression scheme, the second quantity of frames representative of second content recorded by the second source device. The compression level report transmission component 1030 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

Figure 11:
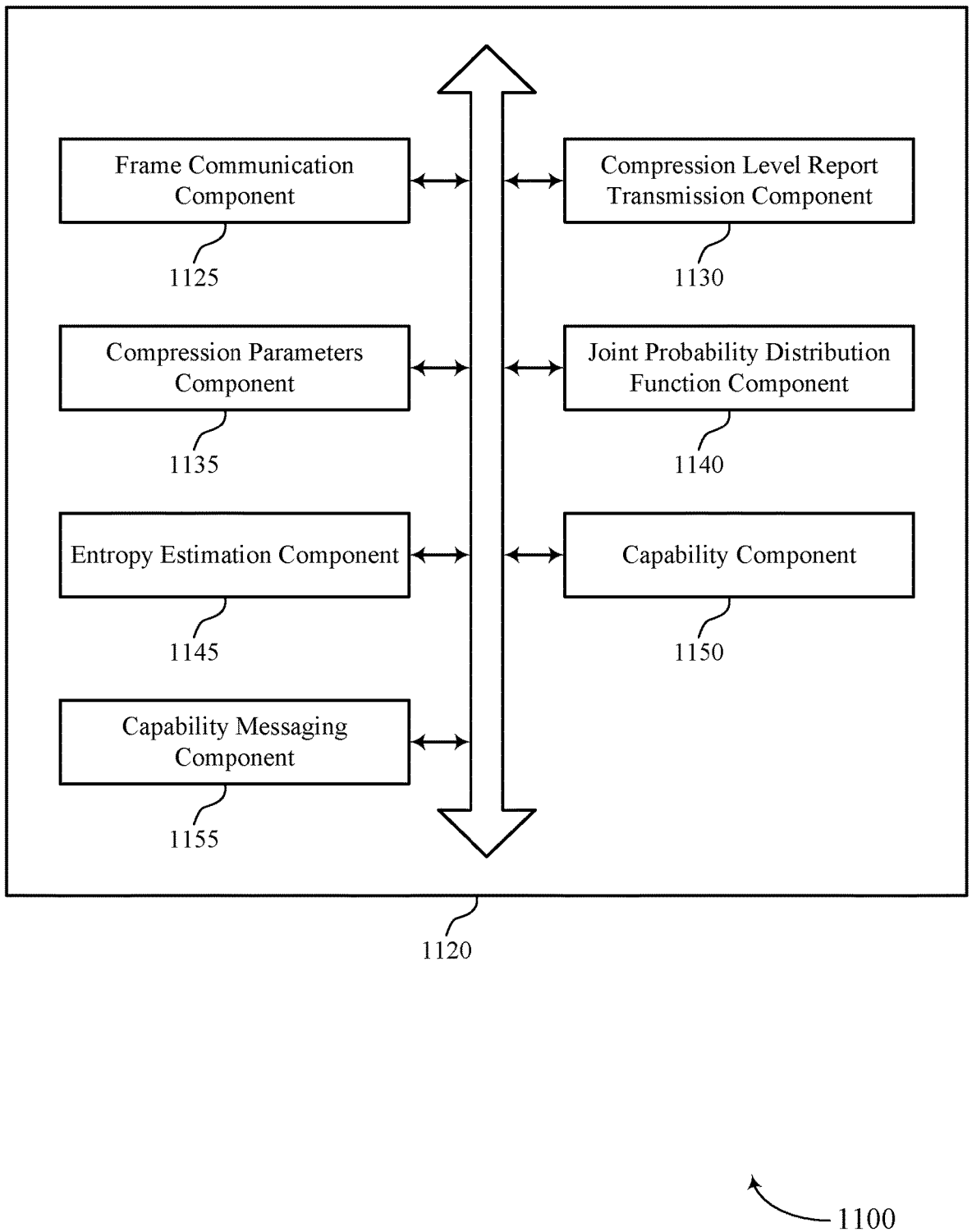
FIG. 11 shows a block diagram of a communications manager that supports compression parameter reporting in accordance with one or more aspects of the present disclosure.

FIG. 11 shows a block diagram 1100 of a communications manager 1120 that supports compression parameter reporting in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of compression parameter reporting as described herein. For example, the communications manager 1120 may include a frame communication component 1125, a compression level report transmission component 1130, a compression parameters component 1135, a joint probability distribution function component 1140, an entropy estimation component 1145, a capability component 1150, a capability messaging component 1155, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a wireless communications device in accordance with examples as disclosed herein. The frame communication component 1125 may be configured as or otherwise support a means for receiving, from a first source device, a first quantity of frames that are compressed in accordance with a first compression scheme, the first quantity of frames representative of first content recorded by the first source device. In some examples, the frame communication component 1125 may be configured as or otherwise support a means for receiving, from a second source device, a second quantity of frames that are compressed in accordance with the first compression scheme, the second quantity of frames representative of second content recorded by the second source device. The compression level report transmission component 1130 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

In some examples, the compression parameters component 1135 may be configured as or otherwise support a means for determining a set of compression parameters for the second compression scheme for the compression of the additional quantities of frames from first source device, where the compression level report includes an indication of the set of compression parameters.

In some examples, the joint probability distribution function component 1140 may be configured as or otherwise support a means for estimating a joint probability distribution function associated with the first quantity of frames and the second quantity of frames. In some examples, the entropy estimation component 1145 may be configured as or otherwise support a means for estimating a first entropy associated with the first quantity of frames and a second entropy associated with the second quantity of frames, where the correlation is based on one or more of the joint probability distribution function, the first entropy, and the second entropy.

In some examples, the compression level report includes one or more of the joint probability distribution function, and the frame communication component 1125 may be configured as or otherwise support a means for receiving a third quantity of frames that are compressed in accordance with a third compression scheme, the third quantity of frames representative of third content recorded by the first source device based on the compression level report and a corresponding capability of the first source device.

In some examples, the capability component 1150 may be configured as or otherwise support a means for receiving, from the first source device, the second source device, or both, a capability message that indicates a corresponding source device is enabled to switch from processing video frames in accordance with the first compression scheme to processing video frames in accordance with a different compression scheme.

In some examples, the capability messaging component 1155 may be configured as or otherwise support a means for transmitting, to the first source device and the second source device, a capability message that indicates the wireless communications device is enabled to determine the correlation between the first content of the first quantity of frames and the second content of the second quantity of frames and transmit the compression level report.

In some examples, the second compression scheme indicates a change in bit rate, discrete cosine transform decimation rate, error correcting coding rate, or any combination thereof, with respect to the first compression scheme.

In some examples, the first source device and the second source device each include an XR device each having at least one camera.

In some examples, the first source device and the second source device each include a camera of an XR device.

In some examples, the wireless communications device includes a UE, a network entity, or a cloud edge processing unit.

Figure 12:
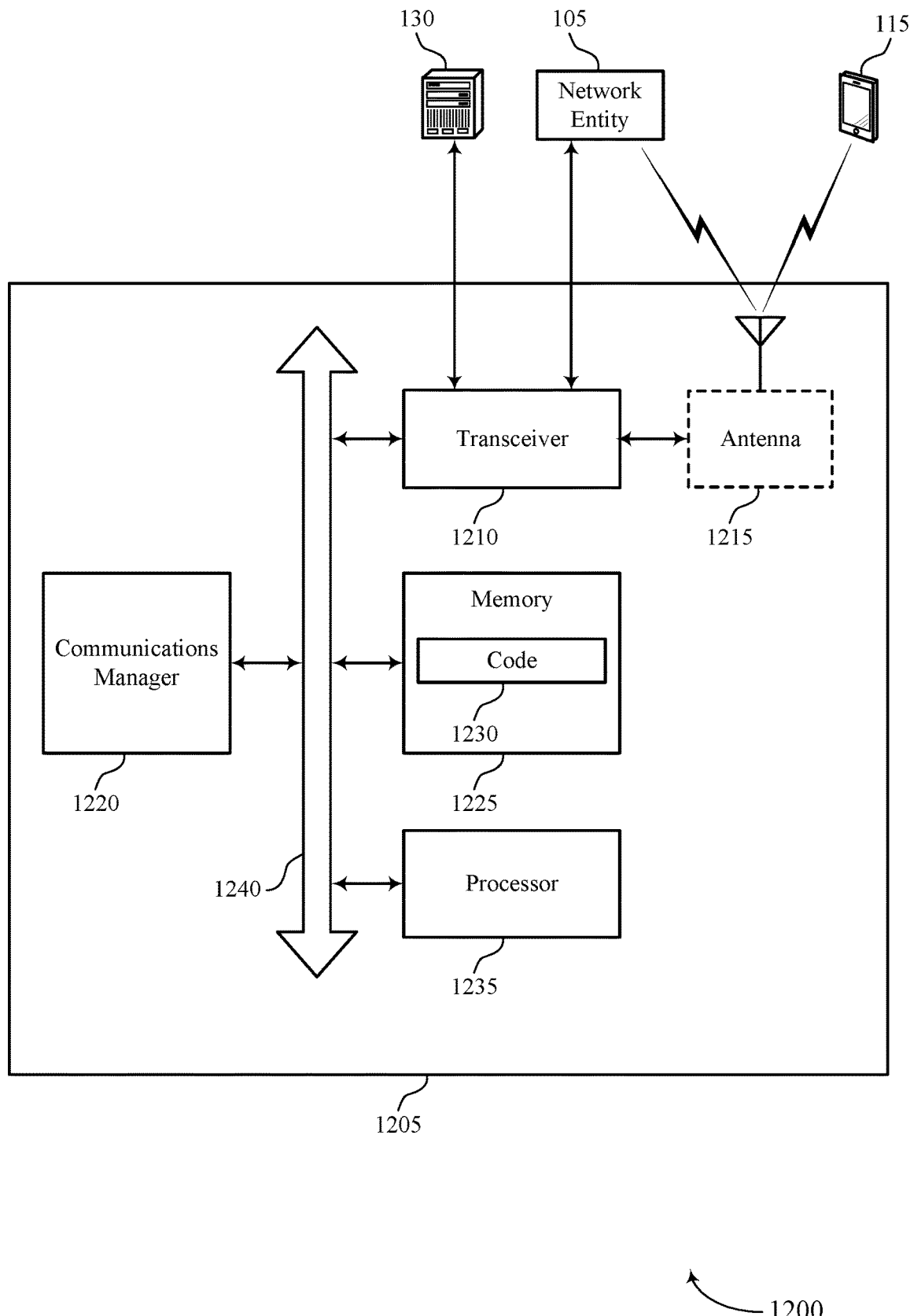
FIG. 12 shows a diagram of a system including a device that supports compression parameter reporting in accordance with one or more aspects of the present disclosure.

FIG. 12 shows a diagram of a system 1200 including a device 1205 that supports compression parameter reporting in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting compression parameter reporting). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a wireless communications device in accordance with examples as disclosed herein. For example, the communications manager 1220 may be configured as or otherwise support a means for receiving, from a first source device, a first quantity of frames that are compressed in accordance with a first compression scheme, the first quantity of frames representative of first content recorded by the first source device. The communications manager 1220 may be configured as or otherwise support a means for receiving, from a second source device, a second quantity of frames that are compressed in accordance with the first compression scheme, the second quantity of frames representative of second content recorded by the second source device. The communications manager 1220 may be configured as or otherwise support a means for transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames.

By including or configuring the communications manager 1220 in accordance with examples as described herein, the device 1205 may support techniques for improved user experience related to reduced processing, reduced power consumption, improved coordination between devices, longer battery life, improved utilization of processing capability, higher data rates, higher capacity, and higher spectral efficiency, among other examples.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of compression parameter reporting as described herein, or the processor 1235 and the memory 1225 may be otherwise configured to perform or support such operations.

Figure 13:
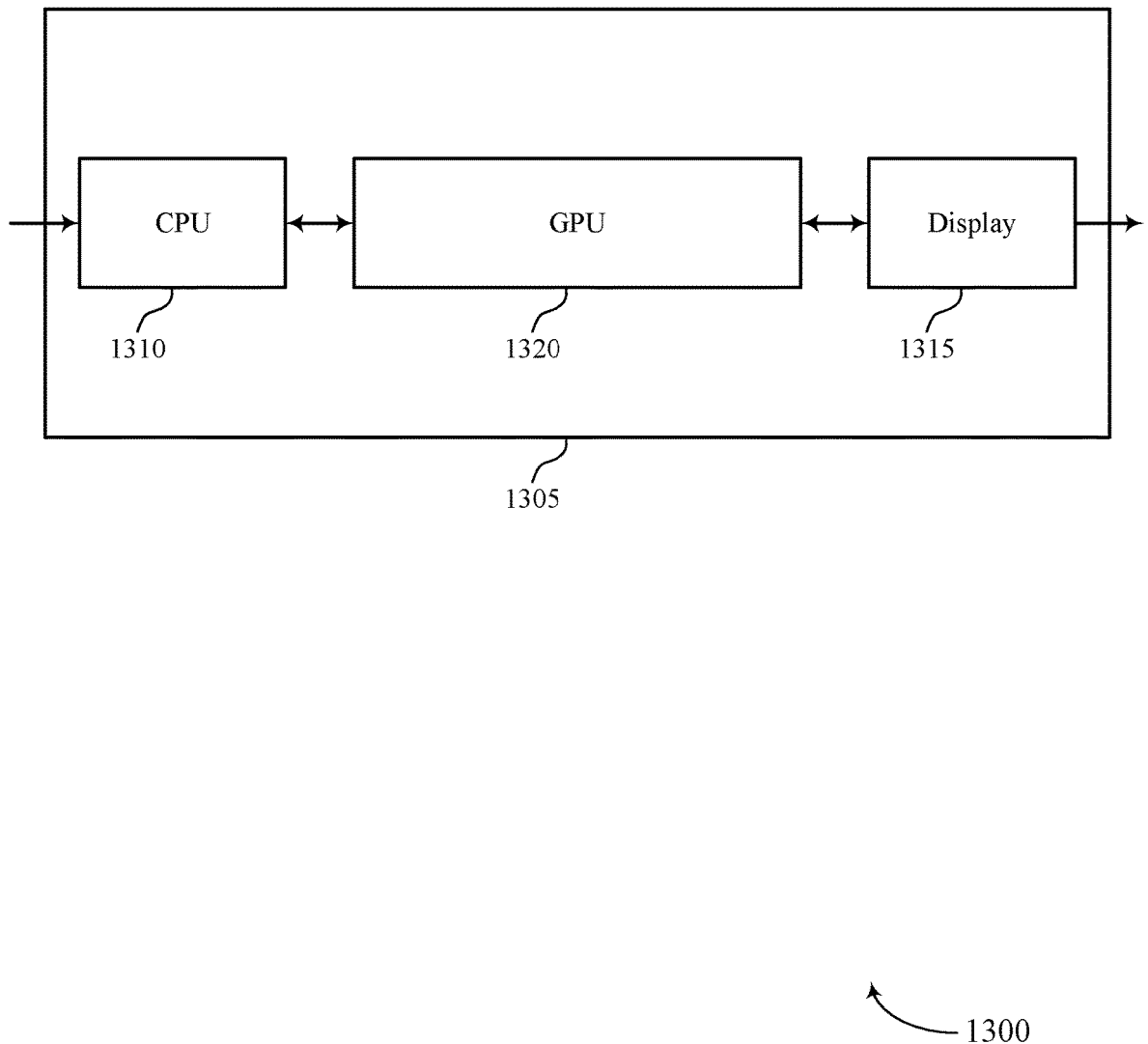
FIGS. 13 and 14 show block diagrams of devices that support compression parameter reporting in accordance with one or more aspects of the present disclosure.

FIG. 13 shows a block diagram 1300 of a device 1305 that supports compression parameter reporting in accordance with one or more aspects of the present disclosure. The device 1305 may be an example of aspects of a graphics processing unit (GPU) device as described herein. The device 1305 may include a CPU 1310, a display 1315, and a GPU 1320. The device 1305 may also include a processor. Each of these components may be in communication with one another (e.g., via one or more buses).

The CPU 1310 may execute one or more software applications, such as web browsers, graphical user interfaces, video games, or other applications involving graphics rendering for image depiction (e.g., via display 1315). As described herein, CPU 1310 may encounter a GPU program (e.g., a program suited for handling by GPU 1320) when executing the one or more software applications. Accordingly, CPU 1310 may submit rendering commands to GPU 1320 (e.g., via a GPU driver containing a compiler for parsing API-based commands).

Display 1315 may display content generated by other components of the device. In some examples, display 1315 may be connected with a display buffer which stores rendered data until an image is ready to be displayed (e.g., as described with reference to FIG. 16. The display 1315 may illuminate according to signals or information generated by other components of the device 1305. For example, the display 1315 may receive display information (e.g., pixel mappings, display adjustments) from GPU 1320, and may illuminate accordingly. The display 1315 may represent a unit capable of displaying video, images, text or any other type of data for consumption by a viewer. Display 1315 may include a liquid-crystal display (LCD), a light emitting diode (LED) display, an organic LED (OLED), an active-matrix OLED (AMOLED), or the like. In some cases, display 1315 and an I/O controller (e.g., I/O controller 1610) may be or represent aspects of a same component (e.g., a touchscreen) of device 1305.

The GPU 1320, the CPU 1310, the display 1315, or various combinations thereof or various components thereof may be examples of means for performing various aspects of compression parameter reporting as described herein. For example, the GPU 1320, the CPU 1310, the display 1315, or various combinations or components thereof may support a method for performing one or more of the functions described herein.

In some examples, the GPU 1320, the CPU 1310, the display 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the GPU 1320, the CPU 1310, the display 1315, or various combinations or components thereof may be implemented in code (e.g., as communications management software or firmware) executed by a processor. If implemented in code executed by a processor, the functions of the GPU 1320, the CPU 1310, the display 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the GPU 1320 may be configured to perform various operations (e.g., receiving, obtaining, monitoring, outputting, transmitting) using or otherwise in cooperation with the CPU 1310, the display 1315, or both. For example, the GPU 1320 may receive information from the CPU 1310, send information to the display 1315, or be integrated in combination with the CPU 1310, the display 1315, or both to obtain information, output information, or perform various other operations as described herein.

The GPU 1320 may support wireless communication at a first source device in accordance with examples as disclosed herein. For example, the GPU 1320 may be configured as or otherwise support a means for transmitting, to a wireless communications device, a first quantity of frames that are compressed in accordance with a first compression scheme, the first quantity of frames representative of first content recorded by the first source device. The GPU 1320 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The GPU 1320 may be configured as or otherwise support a means for transmitting, to the wireless communications device, a third quantity of frames that are compressed in accordance with the second compression scheme, the third quantity of frames representative of third content recorded by the first source device.

By including or configuring the GPU 1320 in accordance with examples as described herein, the device 1305 (e.g., a processor controlling or otherwise coupled with the CPU 1310, the display 1315, the GPU 1320, or a combination thereof) may support techniques for reduced processing, reduced power consumption, and higher throughput, among other examples.

Figure 14:
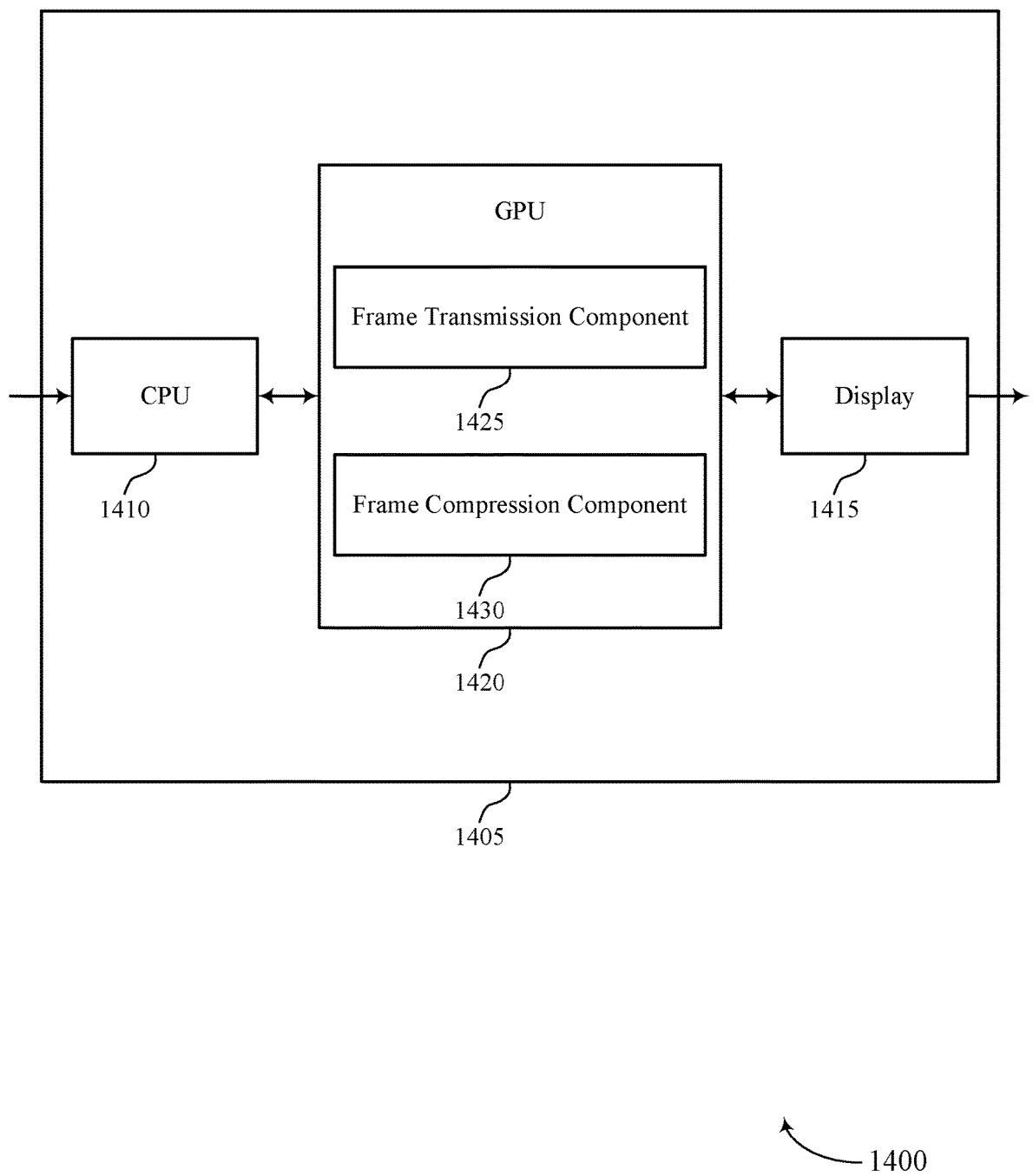

FIG. 14 shows a block diagram 1400 of a device 1405 that supports compression parameter reporting in accordance with one or more aspects of the present disclosure. The device 1405 may be an example of aspects of a device 1305 or a GPU device as described herein. The device 1405 may include a CPU 1410, a display 1415, and a GPU 1420. The device 1405 may also include a processor. Each of these components may be in communication with one another (e.g., via one or more buses).

The CPU 1410 may execute one or more software applications, such as web browsers, graphical user interfaces, video games, or other applications involving graphics rendering for image depiction (e.g., via display 1415). As described herein, CPU 1410 may encounter a GPU program (e.g., a program suited for handling by GPU 1420) when executing the one or more software applications. Accordingly, CPU 1410 may submit rendering commands to GPU 1420 (e.g., via a GPU driver containing a compiler for parsing API-based commands).

Display 1415 may display content generated by other components of the device. In some examples, display 1415 may be connected with a display buffer which stores rendered data until an image is ready to be displayed (e.g., as described with reference to FIG. 16. The display 1415 may illuminate according to signals or information generated by other components of the device 1405. For example, the display 1415 may receive display information (e.g., pixel mappings, display adjustments) from GPU 1420, and may illuminate accordingly. The display 1415 may represent a unit capable of displaying video, images, text or any other type of data for consumption by a viewer. Display 1415 may include a liquid-crystal display (LCD), a light emitting diode (LED) display, an organic LED (OLED), an active-matrix OLED (AMOLED), or the like. In some cases, display 1415 and an I/O controller (e.g., I/O controller 1610) may be or represent aspects of a same component (e.g., a touchscreen) of device 1405.

The device 1405, or various components thereof, may be an example of means for performing various aspects of compression parameter reporting as described herein. For example, the GPU 1420 may include a frame transmission component 1425 a frame compression component 1430, or any combination thereof. The GPU 1420 may be an example of aspects of a GPU 1320 as described herein. In some examples, the GPU 1420, or various components thereof, may be configured to perform various operations (e.g., receiving, obtaining, monitoring, outputting, transmitting) using or otherwise in cooperation with the CPU 1410, the display 1415, or both. For example, the GPU 1420 may receive information from the CPU 1410, send information to the display 1415, or be integrated in combination with the CPU 1410, the display 1415, or both to obtain information, output information, or perform various other operations as described herein.

The GPU 1420 may support wireless communication at a first source device in accordance with examples as disclosed herein. The frame transmission component 1425 may be configured as or otherwise support a means for transmitting, to a wireless communications device, a first quantity of frames that are compressed in accordance with a first compression scheme, the first quantity of frames representative of first content recorded by the first source device. The frame compression component 1430 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The frame transmission component 1425 may be configured as or otherwise support a means for transmitting, to the wireless communications device, a third quantity of frames that are compressed in accordance with the second compression scheme, the third quantity of frames representative of third content recorded by the first source device.

Figure 15:
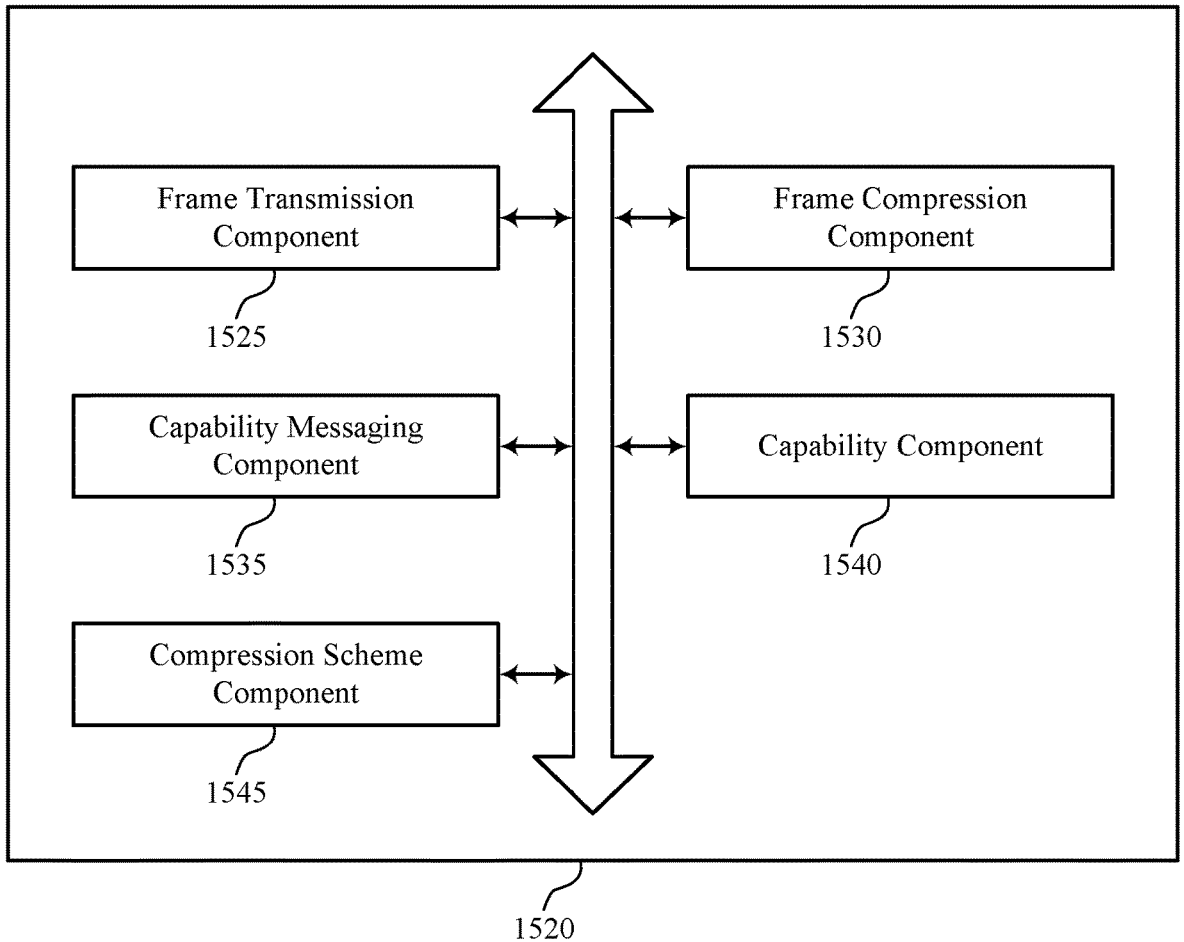
FIG. 15 shows a block diagram of a graphics processing unit (GPU) that supports compression parameter reporting in accordance with one or more aspects of the present disclosure.

FIG. 15 shows a block diagram 1500 of a GPU 1520 that supports compression parameter reporting in accordance with one or more aspects of the present disclosure. The GPU 1520 may be an example of aspects of a GPU 1320, a GPU 1420, or both, as described herein. The GPU 1520, or various components thereof, may be an example of means for performing various aspects of compression parameter reporting as described herein. For example, the GPU 1520 may include a frame transmission component 1525, a frame compression component 1530, a capability messaging component 1535, a capability component 1540, a compression scheme component 1545, or any combination thereof. Each of these components may communicate, directly or indirectly, with one another (e.g., via one or more buses).

The GPU 1520 may support wireless communication at a first source device in accordance with examples as disclosed herein. The frame transmission component 1525 may be configured as or otherwise support a means for transmitting, to a wireless communications device, a first quantity of frames that are compressed in accordance with a first compression scheme, the first quantity of frames representative of first content recorded by the first source device. The frame compression component 1530 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. In some examples, the frame transmission component 1525 may be configured as or otherwise support a means for transmitting, to the wireless communications device, a third quantity of frames that are compressed in accordance with the second compression scheme, the third quantity of frames representative of third content recorded by the first source device.

In some examples, the compression level report includes a first set of compression parameters for the first source device, a second set of compression parameters for the second source device, or both.

In some examples, the correlation is determined based on an estimated joint probability distribution function associated with the first quantity of frames and the second quantity of frames, a first entropy associated with the first quantity of frames, and a second entropy associated with the second quantity of frames.

In some examples, the compression level report includes one or more of the estimated joint probability distribution function, and the compression scheme component 1545 may be configured as or otherwise support a means for determining the second compression scheme based on a capability of the first source device and the compression level report, where transmitting the third quantity of frames processed in accordance with the second compression scheme is based on the determining.

In some examples, the capability messaging component 1535 may be configured as or otherwise support a means for transmitting a capability message that indicates that the first source device is enabled to switch from processing video frames in accordance with the first compression scheme to processing video frames in accordance with a different compression scheme.

In some examples, the capability component 1540 may be configured as or otherwise support a means for receiving a capability message that indicates the wireless communications device is enabled to determine the correlation between the first content of the first quantity of frames and the second content of the second quantity of frames and transmit the compression level report.

In some examples, the second compression scheme indicates a change in bit rate, discrete cosine transform decimation rate, error correcting check coding rate, or any combination thereof, with respect to the first compression scheme.

In some examples, the first source device and the second source device each include an XR device each having at least one camera.

In some examples, the first source device and the second source device each include a camera of an XR device.

In some examples, the wireless communications device includes a UE, a network entity, or a cloud edge processing unit.

Figure 16:
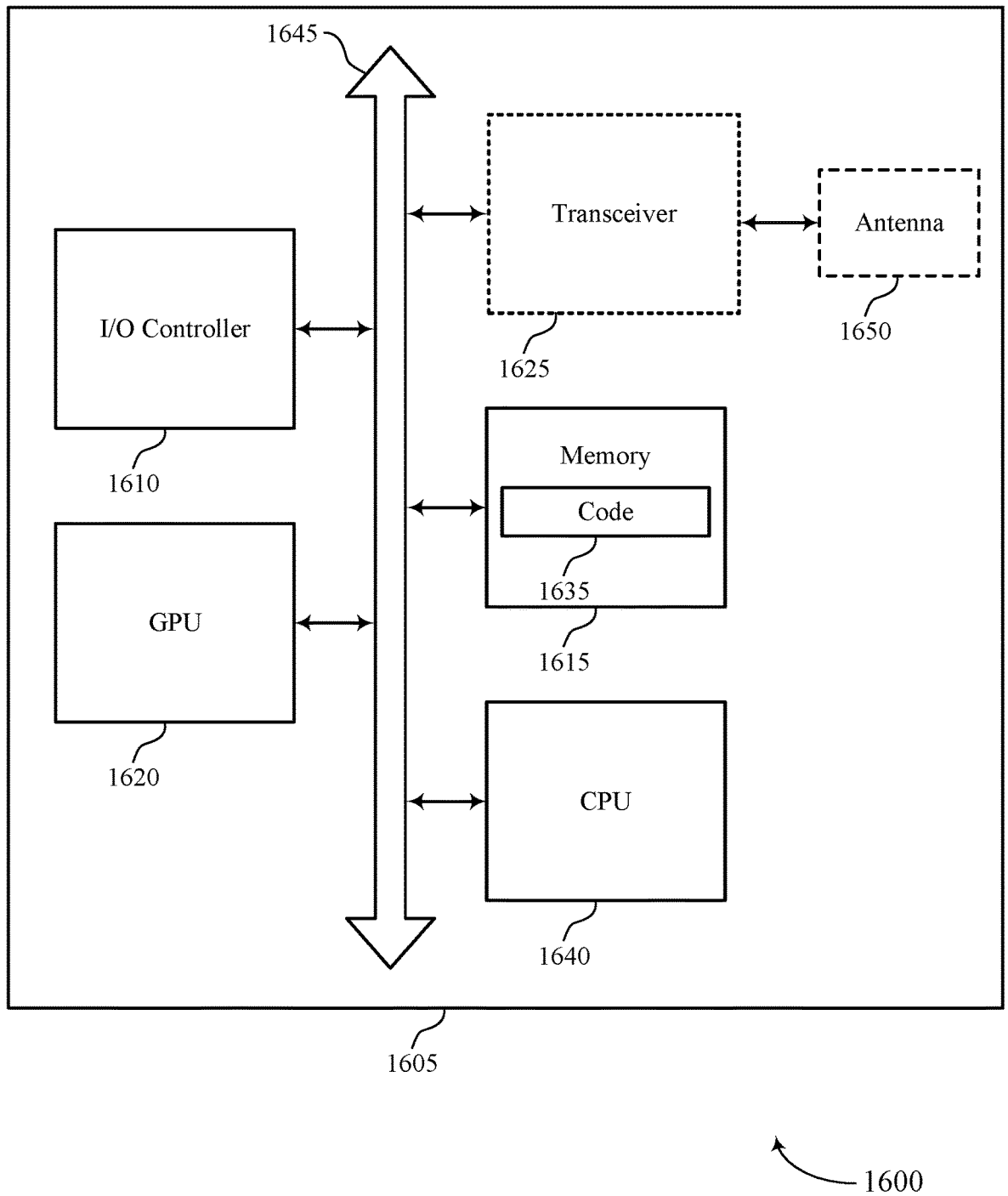
FIG. 16 shows a diagram of a system including a device that supports compression parameter reporting in accordance with one or more aspects of the present disclosure.

FIG. 16 shows a diagram of a system 1600 including a device 1605 that supports compression parameter reporting in accordance with one or more aspects of the present disclosure. The device 1605 may be an example of or include the components of a device 1305, a device 1405, or a GPU device as described herein. The device 1605 may include components for bi-directional voice and data communications including components for transmitting and receiving communications, such as a GPU 1620, an I/O controller 1610, a memory 1615, a transceiver 1625, an antenna 1650, and a CPU 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. In some other cases, the I/O controller 1610 may represent or interact with a modem, a keyboard, a mouse, a touchscreen, or a similar device. In some cases, the I/O controller 1610 may be implemented as part of a processor, such as the CPU 1640. In some cases, a user may interact with the device 1605 via the I/O controller 1610 or via hardware components controlled by the I/O controller 1610.

The memory 1615 may include RAM and ROM. The memory 1615 may store computer-readable, computer-executable code 1635 including instructions that, when executed by the CPU 1640, cause the device 1605 to perform various functions described herein. The code 1635 may be stored in a non-transitory computer-readable medium such as system memory or other type of memory. In some cases, the code 1635 may not be directly executable by the CPU 1640 but may cause a computer (e.g., when compiled and executed) to perform functions described herein. In some cases, the memory 1615 may contain, among other things, a BIOS which may control basic hardware or software operation such as the interaction with peripheral components or devices.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the CPU 1640 but may cause a computer (e.g., when compiled and executed) to perform functions described herein.

The GPU 1620 may support wireless communication at a first source device in accordance with examples as disclosed herein. For example, the GPU 1620 may be configured as or otherwise support a means for transmitting, to a wireless communications device, a first quantity of frames that are compressed in accordance with a first compression scheme, the first quantity of frames representative of first content recorded by the first source device. The GPU 1620 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The GPU 1620 may be configured as or otherwise support a means for transmitting, to the wireless communications device, a third quantity of frames that are compressed in accordance with the second compression scheme, the third quantity of frames representative of third content recorded by the first source device.

By including or configuring the GPU 1620 in accordance with examples as described herein, the device 1605 may support techniques for improved user experience related to reduced processing, reduced power consumption, improved coordination between devices, longer battery life, improved utilization of processing capability, higher data rates, higher capacity, and higher spectral efficiency, among other examples.

The GPU 1620, or its sub-components, may be implemented in hardware, code (e.g., software or firmware) executed by a processor, or any combination thereof. If implemented in code executed by a processor, the functions of the GPU 1620, or its sub-components may be executed by a general-purpose processor, a DSP, an ASIC, an FPGA or other programmable logic device, discrete gate or transistor logic, discrete hardware components, or any combination thereof designed to perform the functions described in the present disclosure. The GPU 1620, or its sub-components, may be physically located at various positions, including being distributed such that portions of functions are implemented at different physical locations by one or more physical components. In some examples, the GPU 1620, or its sub-components, may be a separate and distinct component in accordance with various aspects of the present disclosure. In some examples, the GPU 1620, or its sub-components, may be combined with one or more other hardware components, including but not limited to an I/O component, a transceiver, a network server, another computing device, one or more other components described in the present disclosure, or a combination thereof in accordance with various aspects of the present disclosure.

Figure 17:
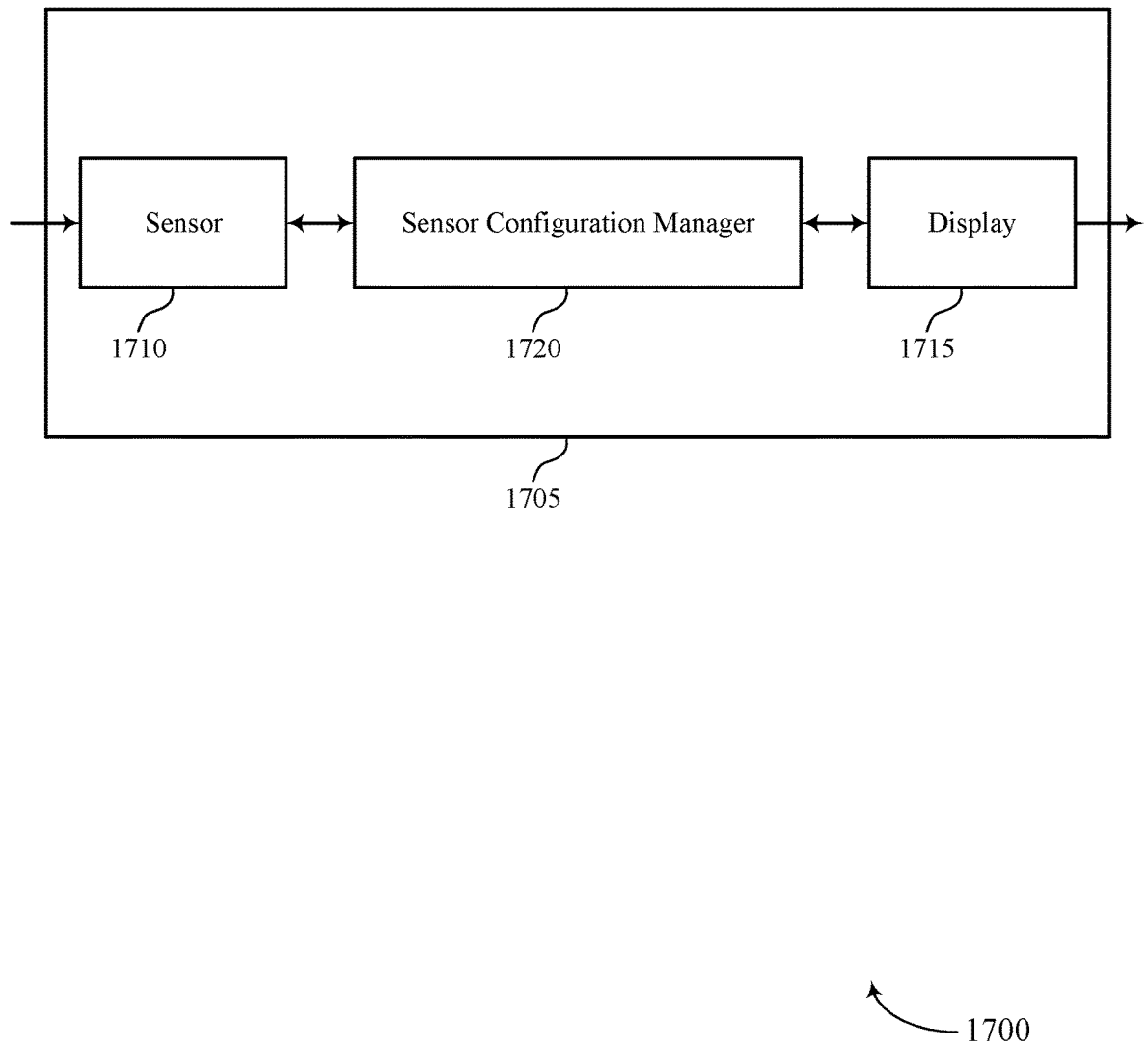
FIGS. 17 and 18 show block diagrams of devices that support compression parameter reporting in accordance with one or more aspects of the present disclosure.

FIG. 17 shows a block diagram 1700 of a device 1705 that supports compression parameter reporting in accordance with one or more aspects of the present disclosure. The device 1705 may be an example of aspects of a Camera Device as described herein. The device 1705 may include a sensor 1710, a display 1715, and a sensor configuration manager 1720. The device 1705 may also include a processor. Each of these components may be in communication with one another (e.g., via one or more buses).

The one or more sensors 1710 (e.g., image sensors, cameras, etc.) may receive information (e.g., light, for example, visible light and/or invisible light), which may be passed on to other components of the device 1705. In some cases, the sensors 1710 may be an example of aspects of the I/O controller 2010 described with reference to FIG. 20. A sensor 1710 may utilize one or more photosensitive elements that have a sensitivity to a spectrum of electromagnetic radiation to receive information (e.g., a sensor 1710 may be configured or tuned to receive a pixel intensity value, red green blue (RGB) values, infrared (IR) light values, near-IR light values, ultraviolet (UV) light values of a pixel, etc.). The information may then be passed on to other components of the device 1705.

Display 1715 may display content generated by other components of the device. Display 1715 may be an example of display 2030 as described with reference to FIG. 20. In some examples, display 2030 may be connected with a display buffer which stores rendered data until an image is ready to be displayed (e.g., as described with reference to FIG. 20). The display 1715 may illuminate according to signals or information generated by other components of the device 1705. For example, the display 1715 may receive display information (e.g., pixel mappings, display adjustments) from sensor 1710, and may illuminate accordingly. The display 1715 may represent a unit capable of displaying video, images, text or any other type of data for consumption by a viewer. Display 1715 may include a liquid-crystal display (LCD), a light emitting diode (LED) display, an organic LED (OLED), an active-matrix OLED (AMOLED), or the like. In some cases, display 1715 and an I/O controller (e.g., I/O controller 2010) may be or represent aspects of a same component (e.g., a touchscreen) of device 1705. The display 1715 may be any suitable display or screen allowing for user interaction and/or allowing for presentation of information (such as captured images and video) for viewing by a user. In some aspects, the display 1715 may be a touch-sensitive display. In some cases, the display 1715 may display images captured by sensors, where the displayed images that are captured by sensors may depend on the configuration of light sources and active sensors by the sensor configuration manager 1720.

The sensor configuration manager 1720, the sensor 1710, the display 1715, or various combinations thereof or various components thereof may be examples of means for performing various aspects of compression parameter reporting as described herein. For example, the sensor configuration manager 1720, the sensor 1710, the display 1715, or various combinations or components thereof may support a method for performing one or more of the functions described herein.

In some examples, the sensor configuration manager 1720, the sensor 1710, the display 1715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the sensor configuration manager 1720, the sensor 1710, the display 1715, or various combinations or components thereof may be implemented in code (e.g., as communications management software or firmware) executed by a processor. If implemented in code executed by a processor, the functions of the sensor configuration manager 1720, the sensor 1710, the display 1715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the sensor configuration manager 1720 may be configured to perform various operations (e.g., receiving, obtaining, monitoring, outputting, transmitting) using or otherwise in cooperation with the sensor 1710, the display 1715, or both. For example, the sensor configuration manager 1720 may receive information from the sensor 1710, send information to the display 1715, or be integrated in combination with the sensor 1710, the display 1715, or both to obtain information, output information, or perform various other operations as described herein.

The sensor configuration manager 1720 may support wireless communication at a first source device in accordance with examples as disclosed herein. For example, the sensor configuration manager 1720 may be configured as or otherwise support a means for transmitting, to a wireless communications device, a first quantity of frames that are compressed in accordance with a first compression scheme, the first quantity of frames representative of first content recorded by the first source device. The sensor configuration manager 1720 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The sensor configuration manager 1720 may be configured as or otherwise support a means for transmitting, to the wireless communications device, a third quantity of frames that are compressed in accordance with the second compression scheme, the third quantity of frames representative of third content recorded by the first source device.

By including or configuring the sensor configuration manager 1720 in accordance with examples as described herein, the device 1705 (e.g., a processor controlling or otherwise coupled with the sensor 1710, the display 1715, the sensor configuration manager 1720, or a combination thereof) may support techniques for reduced processing, reduced power consumption, and higher throughput, among other examples.

Figure 18:
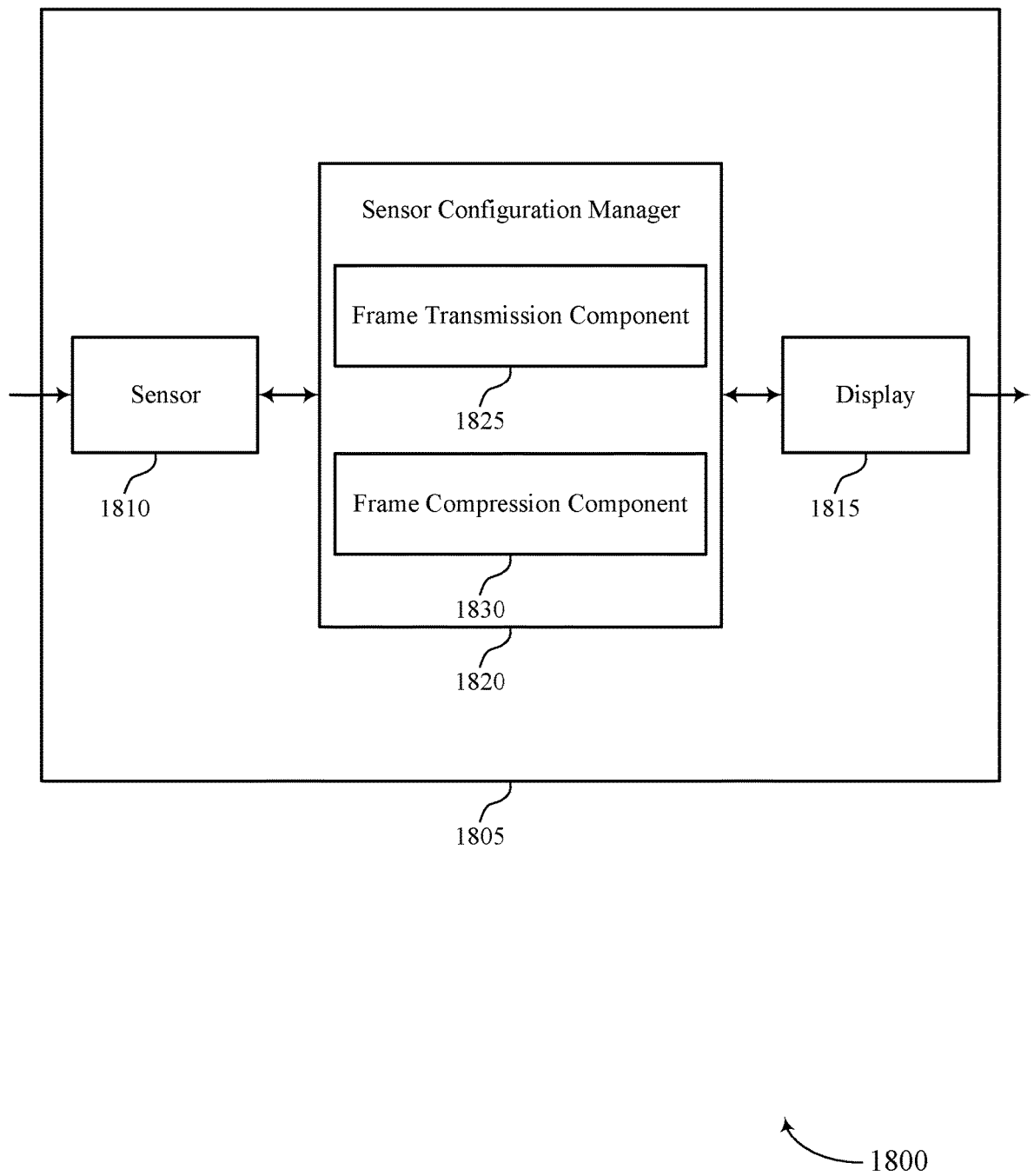

FIG. 18 shows a block diagram 1800 of a device 1805 that supports compression parameter reporting in accordance with one or more aspects of the present disclosure. The device 1805 may be an example of aspects of a device 1705 or a Camera Device 115 as described herein. The device 1805 may include a sensor 1810, a display 1815, and a sensor configuration manager 1820. The device 1805 may also include a processor. Each of these components may be in communication with one another (e.g., via one or more buses).

The one or more sensors 1810 (e.g., image sensors, cameras, etc.) may receive information (e.g., light, for example, visible light and/or invisible light), which may be passed on to other components of the device 1805. In some cases, the sensors 1810 may be an example of aspects of the I/O controller 2010 described with reference to FIG. 20. A sensor 1810 may utilize one or more photosensitive elements that have a sensitivity to a spectrum of electromagnetic radiation to receive information (e.g., a sensor 1810 may be configured or tuned to receive a pixel intensity value, red green blue (RGB) values, infrared (IR) light values, near-IR light values, ultraviolet (UV) light values of a pixel, etc.). The information may then be passed on to other components of the device 1805.

Display 1815 may display content generated by other components of the device. Display 1815 may be an example of display 2030 as described with reference to FIG. 20. In some examples, display 2030 may be connected with a display buffer which stores rendered data until an image is ready to be displayed (e.g., as described with reference to FIG. 20). The display 1815 may illuminate according to signals or information generated by other components of the device 1805. For example, the display 1815 may receive display information (e.g., pixel mappings, display adjustments) from sensor 1810, and may illuminate accordingly. The display 1815 may represent a unit capable of displaying video, images, text or any other type of data for consumption by a viewer. Display 1815 may include a liquid-crystal display (LCD), a light emitting diode (LED) display, an organic LED (OLED), an active-matrix OLED (AMOLED), or the like. In some cases, display 1815 and an I/O controller (e.g., I/O controller 2010) may be or represent aspects of a same component (e.g., a touchscreen) of device 1805. The display 1815 may be any suitable display or screen allowing for user interaction and/or allowing for presentation of information (such as captured images and video) for viewing by a user. In some aspects, the display 1815 may be a touch-sensitive display. In some cases, the display 1815 may display images captured by sensors, where the displayed images that are captured by sensors may depend on the configuration of light sources and active sensors by the sensor configuration manager 1820.

The device 1805, or various components thereof, may be an example of means for performing various aspects of compression parameter reporting as described herein. For example, the sensor configuration manager 1820 may include a frame transmission component 1825 a frame compression component 1830, or any combination thereof. The sensor configuration manager 1820 may be an example of aspects of a sensor configuration manager 1720 as described herein. In some examples, the sensor configuration manager 1820, or various components thereof, may be configured to perform various operations (e.g., receiving, obtaining, monitoring, outputting, transmitting) using or otherwise in cooperation with the sensor 1810, the display 1815, or both. For example, the sensor configuration manager 1820 may receive information from the sensor 1810, send information to the display 1815, or be integrated in combination with the sensor 1810, the display 1815, or both to obtain information, output information, or perform various other operations as described herein.

The sensor configuration manager 1820 may support wireless communication at a first source device in accordance with examples as disclosed herein. The frame transmission component 1825 may be configured as or otherwise support a means for transmitting, to a wireless communications device, a first quantity of frames that are compressed in accordance with a first compression scheme, the first quantity of frames representative of first content recorded by the first source device. The frame compression component 1830 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The frame transmission component 1825 may be configured as or otherwise support a means for transmitting, to the wireless communications device, a third quantity of frames that are compressed in accordance with the second compression scheme, the third quantity of frames representative of third content recorded by the first source device.

Figure 19:
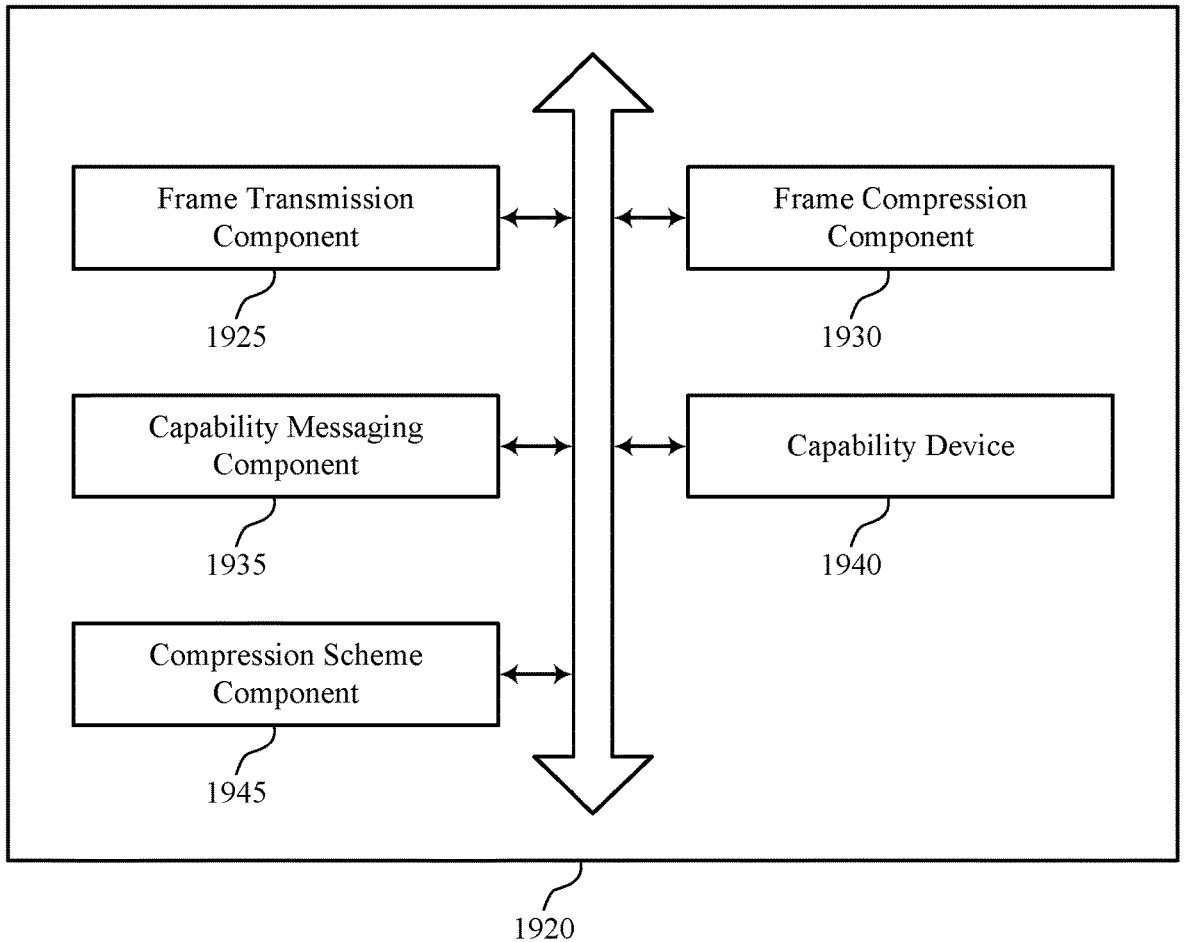
FIG. 19 shows a block diagram of a sensor configuration manager that supports compression parameter reporting in accordance with one or more aspects of the present disclosure.

FIG. 19 shows a block diagram 1900 of a sensor configuration manager 1920 that supports compression parameter reporting in accordance with one or more aspects of the present disclosure. The sensor configuration manager 1920 may be an example of aspects of a sensor configuration manager 1720, a sensor configuration manager 1820, or both, as described herein. The sensor configuration manager 1920, or various components thereof, may be an example of means for performing various aspects of compression parameter reporting as described herein. For example, the sensor configuration manager 1920 may include a frame transmission component 1925, a frame compression component 1930, a capability messaging component 1935, a capability device 1940, a compression scheme component 1945, or any combination thereof. Each of these components may communicate, directly or indirectly, with one another (e.g., via one or more buses).

The sensor configuration manager 1920 may support wireless communication at a first source device in accordance with examples as disclosed herein. The frame transmission component 1925 may be configured as or otherwise support a means for transmitting, to a wireless communications device, a first quantity of frames that are compressed in accordance with a first compression scheme, the first quantity of frames representative of first content recorded by the first source device. The frame compression component 1930 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. In some examples, the frame transmission component 1925 may be configured as or otherwise support a means for transmitting, to the wireless communications device, a third quantity of frames that are compressed in accordance with the second compression scheme, the third quantity of frames representative of third content recorded by the first source device.

In some examples, the compression level report includes a first set of compression parameters for the first source device, a second set of compression parameters for the second source device, or both.

In some examples, the correlation is determined based on an estimated joint probability distribution function associated with the first quantity of frames and the second quantity of frames, a first entropy associated with the first quantity of frames, and a second entropy associated with the second quantity of frames.

In some examples, the compression level report includes one or more of the estimated joint probability distribution function, and the compression scheme component 1945 may be configured as or otherwise support a means for determining the second compression scheme based on a capability of the first source device and the compression level report, where transmitting the third quantity of frames processed in accordance with the second compression scheme is based on the determining.

In some examples, the capability messaging component 1935 may be configured as or otherwise support a means for transmitting a capability message that indicates that the first source device is enabled to switch from processing video frames in accordance with the first compression scheme to processing video frames in accordance with a different compression scheme.

In some examples, the capability device 1940 may be configured as or otherwise support a means for receiving a capability message that indicates the wireless communications device is enabled to determine the correlation between the first content of the first quantity of frames and the second content of the second quantity of frames and transmit the compression level report.

In some examples, the second compression scheme indicates a change in bit rate, discrete cosine transform decimation rate, error correcting check coding rate, or any combination thereof, with respect to the first compression scheme.

In some examples, the first source device and the second source device each include an XR device each having at least one camera.

In some examples, the first source device and the second source device each include a camera of an XR device.

In some examples, the wireless communications device includes a UE, a network entity, or a cloud edge processing unit.

Figure 20:
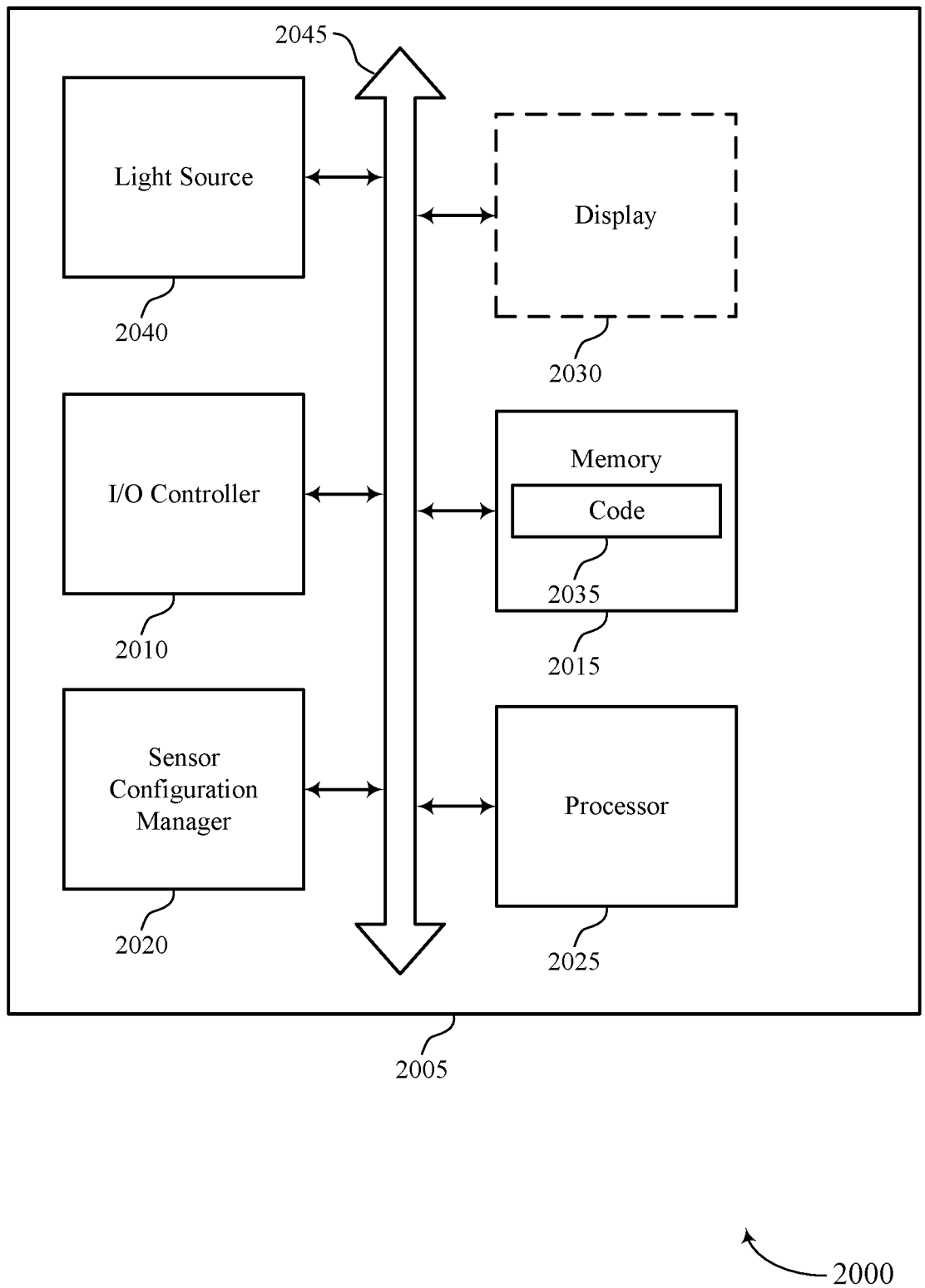
FIG. 20 shows a diagram of a system including a device that supports compression parameter reporting in accordance with one or more aspects of the present disclosure.

FIG. 20 shows a diagram of a system 2000 including a device 2005 that supports compression parameter reporting in accordance with one or more aspects of the present disclosure. The device 2005 may be an example of or include the components of a device 1705, a device 1805, or a Camera Device as described herein. The device 2005 may include components for bi-directional voice and data communications including components for transmitting and receiving communications, such as a sensor configuration manager 2020, an I/O controller 2010, a memory 2015, a processor 2025, a display 203, and a light source 2040. These components may be in electronic communication or otherwise coupled (e.g., operatively, communicatively, functionally, electronically, electrically) via one or more buses (e.g., a bus 2045).

The I/O controller 2010 may manage input and output signals for the device 2005. The I/O controller 2010 may also manage peripherals not integrated into the device 2005. In some cases, the I/O controller 2010 may represent a physical connection or port to an external peripheral. In some cases, the I/O controller 2010 may utilize an operating system such as iOS®, ANDROID®, MS-DOS®, MS-WINDOWS®, OS/2®, UNIX®, LINUX®, or another known operating system. In some other cases, the I/O controller 2010 may represent or interact with a modem, a keyboard, a mouse, a touchscreen, or a similar device. In some cases, the I/O controller 2010 may be implemented as part of a processor, such as the processor 2025. In some cases, a user may interact with the device 2005 via the I/O controller 2010 or via hardware components controlled by the I/O controller 2010.

The memory 2015 may include RAM and ROM. The memory 2015 may store computer-readable, computer-executable code 2035 including instructions that, when executed by the processor 2025, cause the device 2005 to perform various functions described herein. The code 2035 may be stored in a non-transitory computer-readable medium such as system memory or other type of memory. In some cases, the code 2035 may not be directly executable by the processor 2025 but may cause a computer (e.g., when compiled and executed) to perform functions described herein. In some cases, the memory 2015 may contain, among other things, a BIOS which may control basic hardware or software operation such as the interaction with peripheral components or devices.

The processor 2025 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2025 may be configured to operate a memory array using a memory controller. In some other cases, a memory controller may be integrated into the processor 2025. The processor 2025 may be configured to execute computer-readable instructions stored in a memory (e.g., the memory 2015) to cause the device 2005 to perform various functions (e.g., functions or tasks supporting compression parameter reporting). For example, the device 2005 or a component of the device 2005 may include a processor 2025 and memory 2015 coupled with or to the processor 2025, the processor 2025 and memory 2015 configured to perform various functions described herein.

The one or more light sources 2040 may include light sources capable of emitting visible light and/or invisible light. In an example, the light sources 2040 may include a visible light source and an active invisible light source (e.g., IR light source, near-IR light source, UV light source). In some cases, the light sources 2040 may be an example of aspects of the light source 2040 described with reference to FIG. 20.

The sensor configuration manager 2020 may support wireless communication at a first source device in accordance with examples as disclosed herein. For example, the sensor configuration manager 2020 may be configured as or otherwise support a means for transmitting, to a wireless communications device, a first quantity of frames that are compressed in accordance with a first compression scheme, the first quantity of frames representative of first content recorded by the first source device. The sensor configuration manager 2020 may be configured as or otherwise support a means for receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The sensor configuration manager 2020 may be configured as or otherwise support a means for transmitting, to the wireless communications device, a third quantity of frames that are compressed in accordance with the second compression scheme, the third quantity of frames representative of third content recorded by the first source device.

By including or configuring the sensor configuration manager 2020 in accordance with examples as described herein, the device 2005 may support techniques for improved user experience related to reduced processing, reduced power consumption, improved coordination between devices, longer battery life, improved utilization of processing capability, higher data rates, higher capacity, and higher spectral efficiency, among other examples.

The sensor configuration manager 2020, or its sub-components, may be implemented in hardware, code (e.g., software or firmware) executed by a processor, or any combination thereof. If implemented in code executed by a processor, the functions of the sensor configuration manager 2020, or its sub-components may be executed by a general-purpose processor, a DSP, an ASIC, a field programmable gate array (FPGA) or other programmable logic device, discrete gate or transistor logic, discrete hardware components, or any combination thereof designed to perform the functions described in the present disclosure. The sensor configuration manager 2020, or its sub-components, may be physically located at various positions, including being distributed such that portions of functions are implemented at different physical locations by one or more physical components. In some examples, the sensor configuration manager 2020, or its sub-components, may be a separate and distinct component in accordance with various aspects of the present disclosure. In some examples, the sensor configuration manager 2020, or its sub-components, may be combined with one or more other hardware components, including but not limited to an I/O component, a camera controller, another computing device, one or more other components described in the present disclosure, or a combination thereof in accordance with various aspects of the present disclosure.

Figure 21:
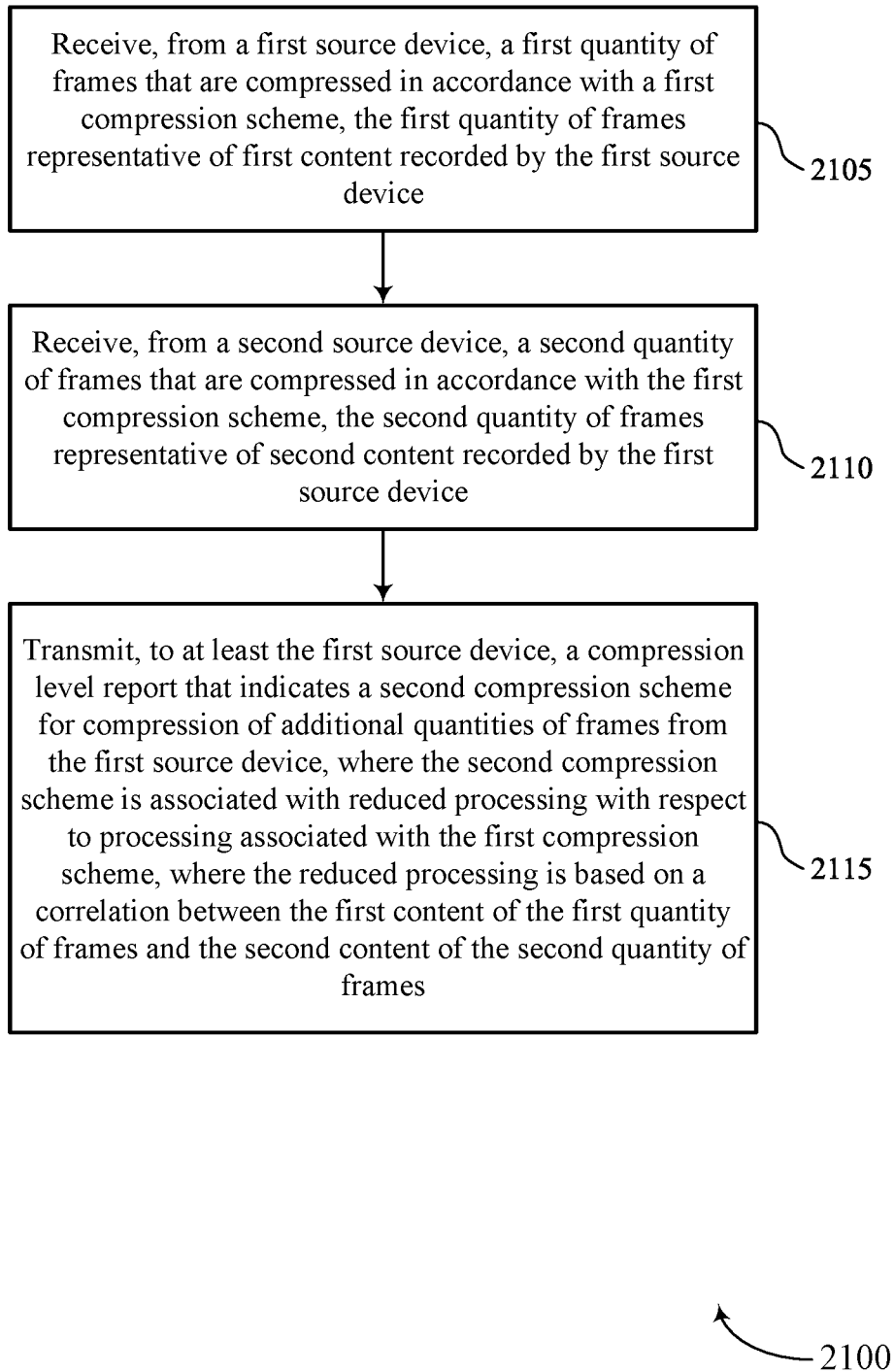
FIGS. 21 through 25 show flowcharts illustrating methods that support compression parameter reporting in accordance with one or more aspects of the present disclosure.

FIG. 21 shows a flowchart illustrating a method 2100 that supports compression parameter reporting in accordance with one or more aspects of the present disclosure. The operations of the method 2100 may be implemented by a UE or a network entity or its components as described herein. For example, the operations of the method 2100 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2105, the method may include receiving, from a first source device, a first quantity of frames that are compressed in accordance with a first compression scheme, the first quantity of frames representative of first content recorded by the first source device. The operations of 2105 may be performed in accordance with examples as disclosed herein. In some examples, aspects of the operations of 2105 may be performed by a frame communication component 725 or a frame communication component 1125 as described with reference to FIGS. 7 and 11.

At 2110, the method may include receiving, from a second source device, a second quantity of frames that are compressed in accordance with the first compression scheme, the second quantity of frames representative of second content recorded by the second source device. The operations of 2110 may be performed in accordance with examples as disclosed herein. In some examples, aspects of the operations of 2110 may be performed by a frame communication component 725 or a frame communication component 1125 as described with reference to FIGS. 7 and 11.

At 2115, the method may include transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames. The operations of 2115 may be performed in accordance with examples as disclosed herein. In some examples, aspects of the operations of 2115 may be performed by a compression level report transmission component 730 or a compression level report transmission component 1130 as described with reference to FIGS. 7 and 11.

Figure 22:
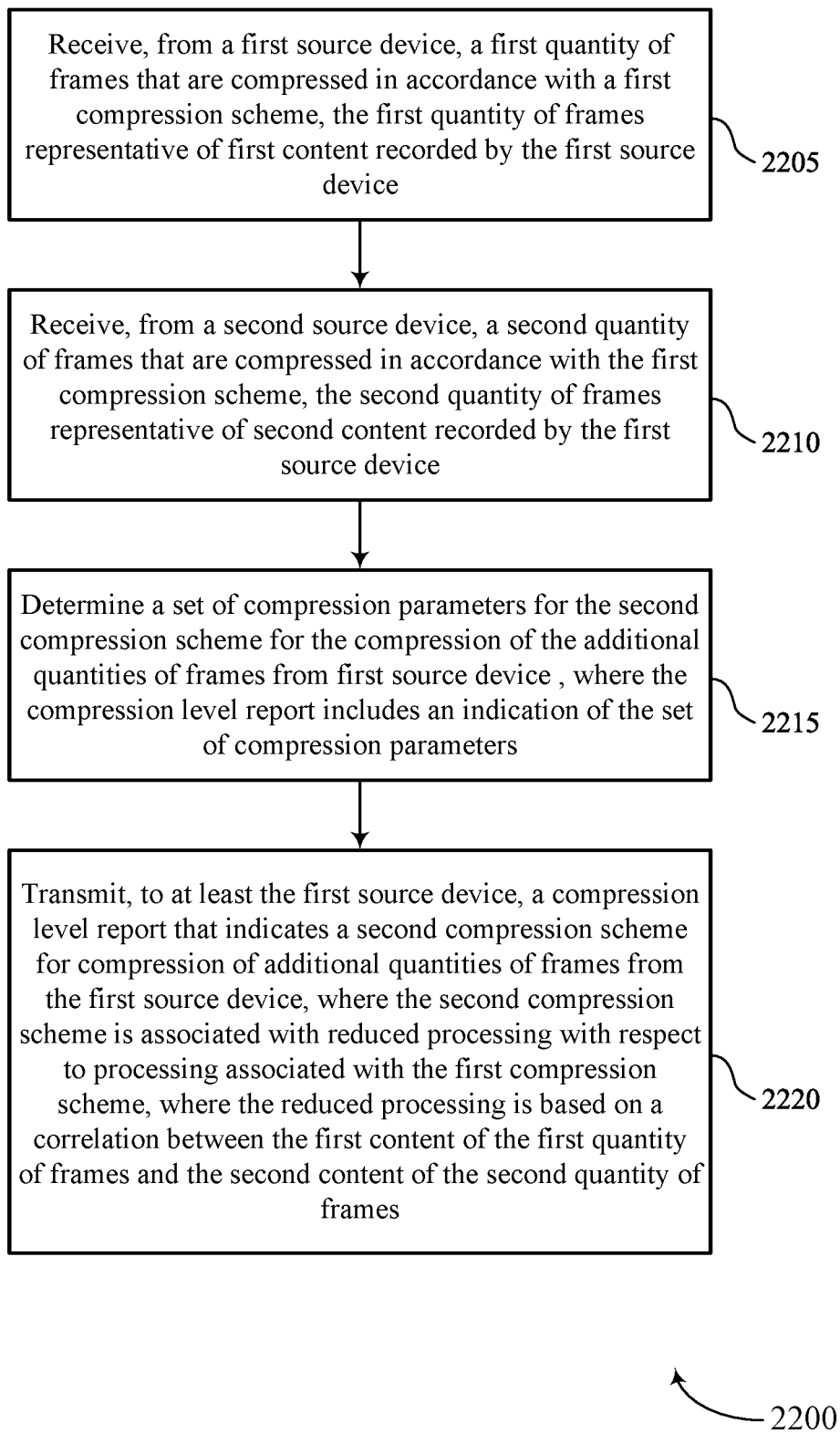

FIG. 22 shows a flowchart illustrating a method 2200 that supports compression parameter reporting in accordance with one or more aspects of the present disclosure. The operations of the method 2200 may be implemented by a UE or a network entity or its components as described herein. For example, the operations of the method 2200 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2205, the method may include receiving, from a first source device, a first quantity of frames that are compressed in accordance with a first compression scheme, the first quantity of frames representative of first content recorded by the first source device. The operations of 2205 may be performed in accordance with examples as disclosed herein. In some examples, aspects of the operations of 2205 may be performed by a frame communication component 725 or a frame communication component 1125 as described with reference to FIGS. 7 and 11.

At 2210, the method may include receiving, from a second source device, a second quantity of frames that are compressed in accordance with the first compression scheme, the second quantity of frames representative of second content recorded by the second source device. The operations of 2210 may be performed in accordance with examples as disclosed herein. In some examples, aspects of the operations of 2210 may be performed by a frame communication component 725 or a frame communication component 1125 as described with reference to FIGS. 7 and 11.

At 2215, the method may include determining a set of compression parameters for the second compression scheme for the compression of the additional quantities of frames from first source device, where the compression level report includes an indication of the set of compression parameters. The operations of 2215 may be performed in accordance with examples as disclosed herein. In some examples, aspects of the operations of 2215 may be performed by a compression parameters component 745 or a compression parameters component 1135 as described with reference to FIGS. 7 and 11.

At 2220, the method may include transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames. The operations of 2220 may be performed in accordance with examples as disclosed herein. In some examples, aspects of the operations of 2220 may be performed by a compression level report transmission component 730 or a compression level report transmission component 1130 as described with reference to FIGS. 7 and 11.

Figure 23:
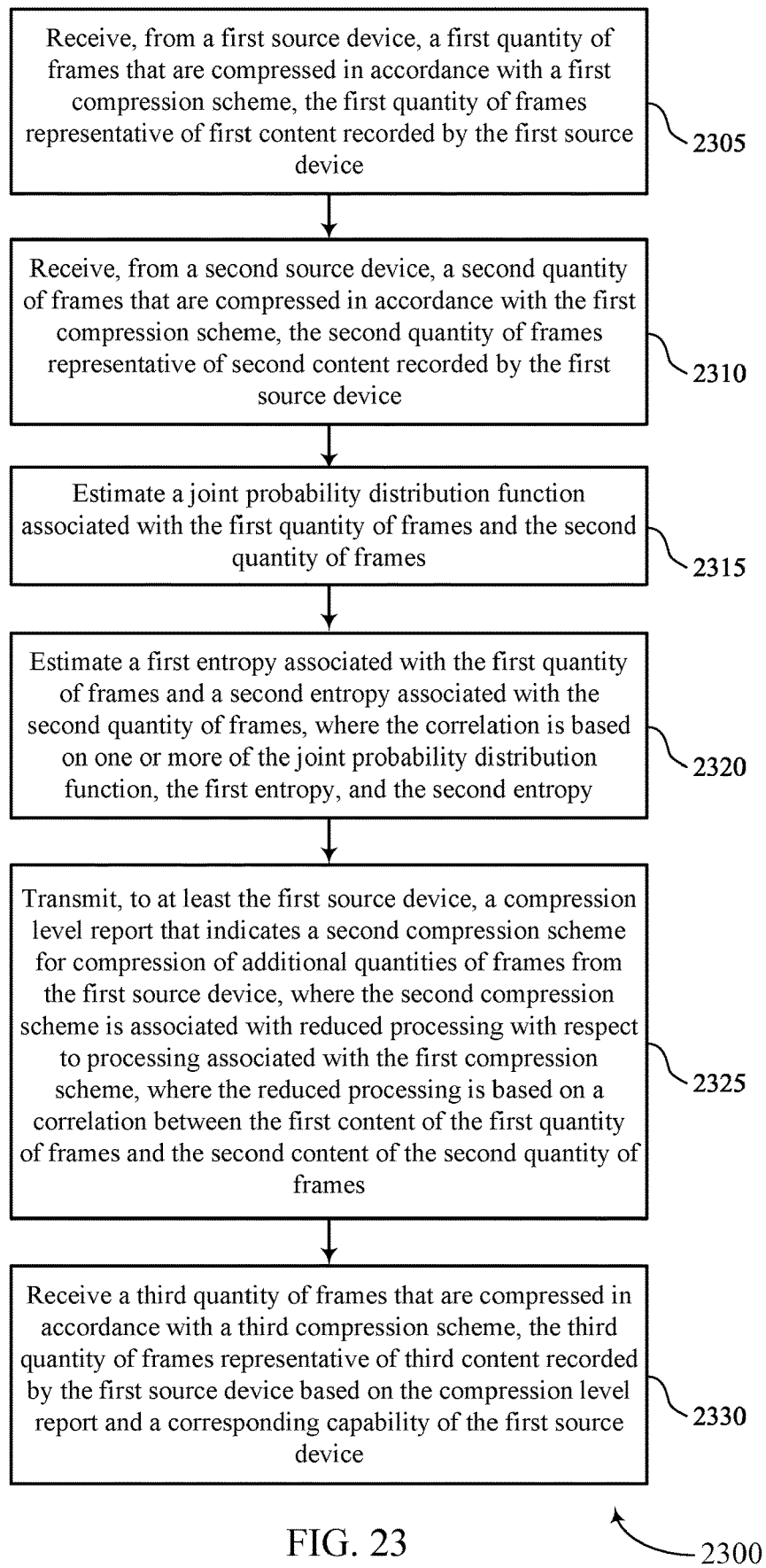

FIG. 23 shows a flowchart illustrating a method 2300 that supports compression parameter reporting in accordance with one or more aspects of the present disclosure. The operations of the method 2300 may be implemented by a UE or a network entity or its components as described herein. For example, the operations of the method 2300 may be performed by a UE 115 as described with reference to FIGS. 1 through 8 or a network entity as described with reference to FIGS. 1 through 4 and 9 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 2305, the method may include receiving, from a first source device, a first quantity of frames that are compressed in accordance with a first compression scheme, the first quantity of frames representative of first content recorded by the first source device. The operations of 2305 may be performed in accordance with examples as disclosed herein. In some examples, aspects of the operations of 2305 may be performed by a frame communication component 725 or a frame communication component 1125 as described with reference to FIGS. 7 and 11.

At 2310, the method may include receiving, from a second source device, a second quantity of frames that are compressed in accordance with the first compression scheme, the second quantity of frames representative of second content recorded by the second source device. The operations of 2310 may be performed in accordance with examples as disclosed herein. In some examples, aspects of the operations of 2310 may be performed by a frame communication component 725 or a frame communication component 1125 as described with reference to FIGS. 7 and 11.

At 2315, the method may include estimating a joint probability distribution function associated with the first quantity of frames and the second quantity of frames. The operations of 2315 may be performed in accordance with examples as disclosed herein. In some examples, aspects of the operations of 2315 may be performed by a joint probability distribution function component 750 or a joint probability distribution function component 1140 as described with reference to FIGS. 7 and 11.

At 2320, the method may include estimating a first entropy associated with the first quantity of frames and a second entropy associated with the second quantity of frames, where the correlation is based on one or more of the joint probability distribution function, the first entropy, and the second entropy. The operations of 2320 may be performed in accordance with examples as disclosed herein. In some examples, aspects of the operations of 2320 may be performed by an entropy estimation component 755 or an entropy estimation component 1145 as described with reference to FIGS. 7 and 11.

At 2325, the method may include transmitting, to at least the first source device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and the second content of the second quantity of frames. The operations of 2325 may be performed in accordance with examples as disclosed herein. In some examples, aspects of the operations of 2325 may be performed by a compression level report transmission component 730 or a compression level report transmission component 1130 as described with reference to FIGS. 7 and 11.

At 2330, the method may include receiving a third quantity of frames that are compressed in accordance with a third compression scheme, the third quantity of frames representative of third content recorded by the first source device based on the compression level report and a corresponding capability of the first source device. The operations of 2330 may be performed in accordance with examples as disclosed herein. In some examples, aspects of the operations of 2330 may be performed by a frame communication component 725 or a frame communication component 1125 as described with reference to FIGS. 7 and 11.

Figure 24:
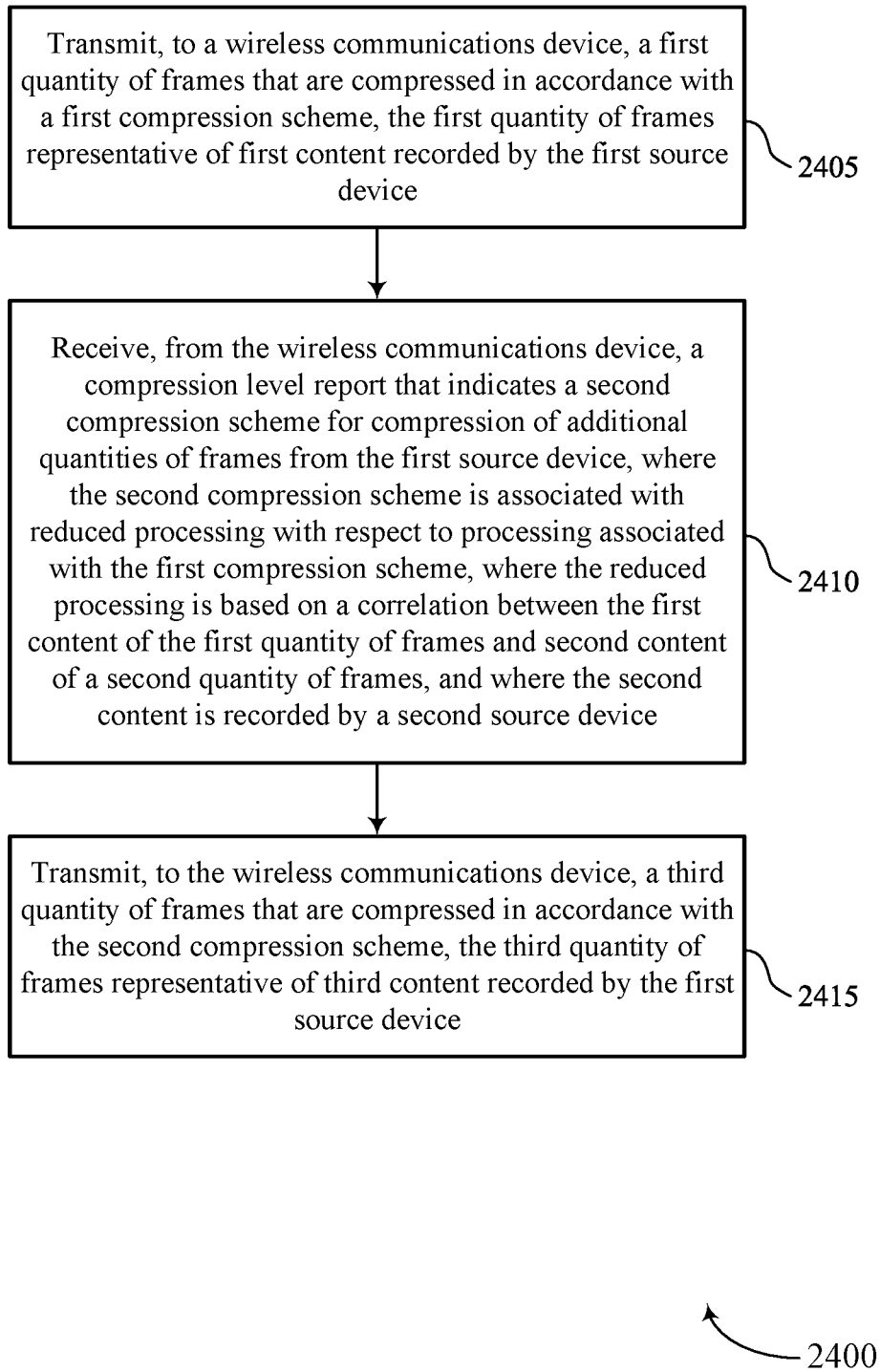

FIG. 24 shows a flowchart illustrating a method 2400 that supports compression parameter reporting in accordance with one or more aspects of the present disclosure. The operations of the method 2400 may be implemented by a UE or its components as described herein. For example, the operations of the method 2400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 2405, the method may include transmitting, to a wireless communications device, a first quantity of frames that are compressed in accordance with a first compression scheme, the first quantity of frames representative of first content recorded by the first source device. The operations of 2405 may be performed in accordance with examples as disclosed herein. In some examples, aspects of the operations of 2405 may be performed by a frame transmission component 735 as described with reference to FIG. 7.

At 2410, the method may include receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The operations of 2410 may be performed in accordance with examples as disclosed herein. In some examples, aspects of the operations of 2410 may be performed by a frame compression component 740 as described with reference to FIG. 7.

At 2415, the method may include transmitting, to the wireless communications device, a third quantity of frames that are compressed in accordance with the second compression scheme, the third quantity of frames representative of third content recorded by the first source device. The operations of 2415 may be performed in accordance with examples as disclosed herein. In some examples, aspects of the operations of 2415 may be performed by a frame transmission component 735 as described with reference to FIG. 7.

Figure 25:
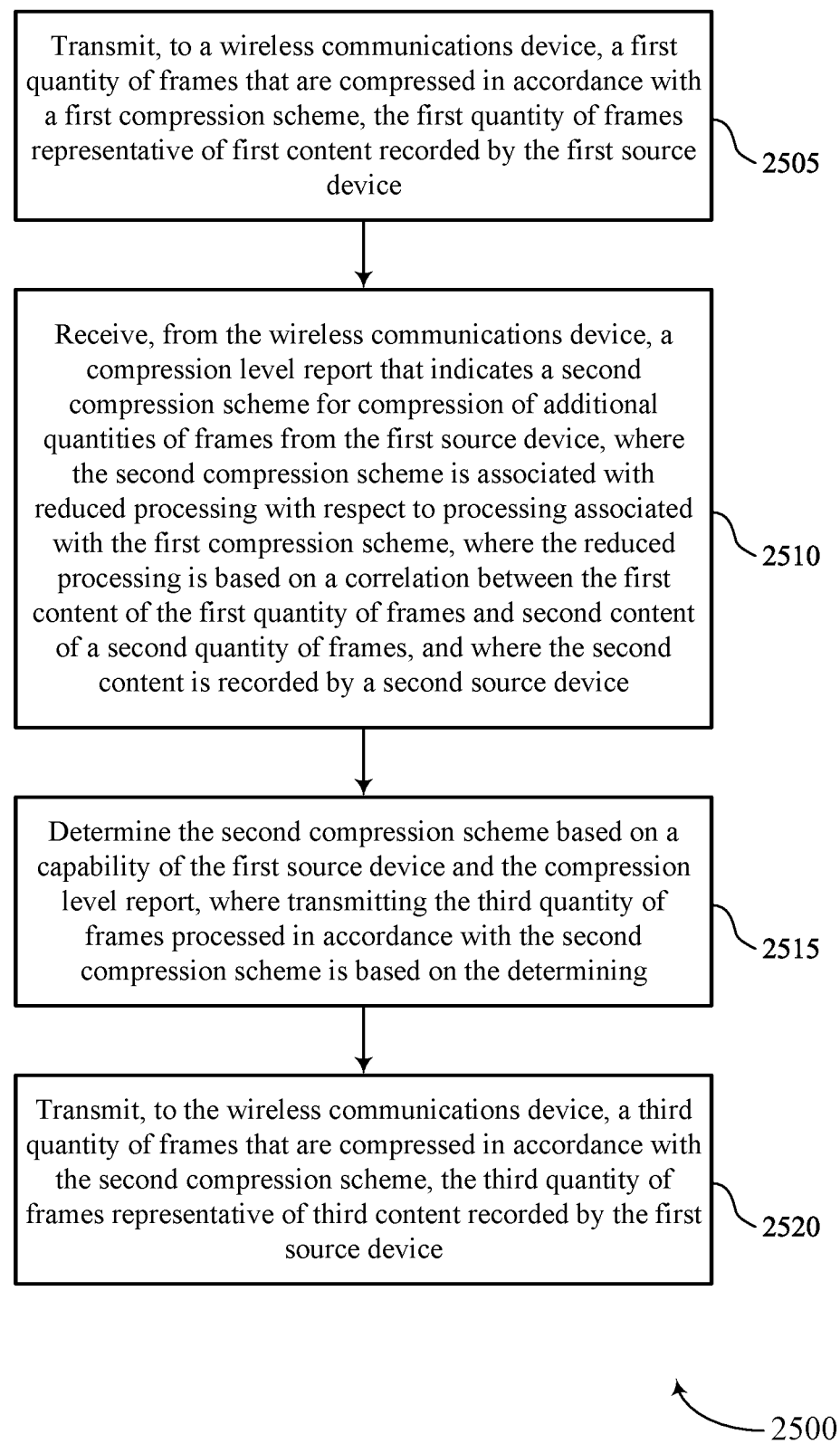

FIG. 25 shows a flowchart illustrating a method 2500 that supports compression parameter reporting in accordance with one or more aspects of the present disclosure. The operations of the method 2500 may be implemented by a UE or its components as described herein. For example, the operations of the method 2500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 2505, the method may include transmitting, to a wireless communications device, a first quantity of frames that are compressed in accordance with a first compression scheme, the first quantity of frames representative of first content recorded by the first source device. The operations of 2505 may be performed in accordance with examples as disclosed herein. In some examples, aspects of the operations of 2505 may be performed by a frame transmission component 735 as described with reference to FIG. 7.

At 2510, the method may include receiving, from the wireless communications device, a compression level report that indicates a second compression scheme for compression of additional quantities of frames from the first source device, where the second compression scheme is associated with reduced processing with respect to processing associated with the first compression scheme, where the reduced processing is based on a correlation between the first content of the first quantity of frames and second content of a second quantity of frames, and where the second content is recorded by a second source device. The operations of 2510 may be performed in accordance with examples as disclosed herein. In some examples, aspects of the operations of 2510 may be performed by a frame compression component 740 as described with reference to FIG. 7.

At 2515, the method may include determining the second compression scheme based on a capability of the first source device and the compression level report, where transmitting the third quantity of frames processed in accordance with the second compression scheme is based on the determining. The operations of 2515 may be performed in accordance with examples as disclosed herein. In some examples, aspects of the operations of 2515 may be performed by a compression scheme component 770 as described with reference to FIG. 7.

At 2520, the method may include transmitting, to the wireless communications device, a third quantity of frames that are compressed in accordance with the second compression scheme, the third quantity of frames representative of third content recorded by the first source device. The operations of 2520 may be performed in accordance with examples as disclosed herein. In some examples, aspects of the operations of 2520 may be performed by a frame transmission component 735 as described with reference to FIG. 7.

The following provides an overview of aspects of the present disclosure:

Aspect 1: A method for wireless communication at a wireless communications device, comprising: receiving, from a first source device, a first quantity of frames that are compressed in accordance with a first compression scheme, the first quantity of frames representative of first content recorded by the first source device; receiving, from a second source device, a second quantity of frames that are compressed in accordance with the first compression scheme, the second quantity of frames representative of second content recorded by the first source device; and transmitting, to at least the first source device, a compression level report that indicates a second compression scheme for compression of additional quantities of frames from the first source device, wherein the second compression scheme is associated with reduced processing with respect to processing associated with the first compression scheme, wherein the reduced processing is based at least in part on a correlation between the first content of the first quantity of frames and the second content of the second quantity of frames.

Aspect 2: The method of aspect 1, further comprising: determining a set of compression parameters for the second compression scheme for the compression of the additional quantities of frames from first source device, wherein the compression level report comprises an indication of the set of compression parameters.

Aspect 3: The method of any of aspects 1 through 2, comprising: estimating a joint probability distribution function associated with the first quantity of frames and the second quantity of frames; and estimating a first entropy associated with the first quantity of frames and a second entropy associated with the second quantity of frames, wherein the correlation is based at least in part on one or more of the joint probability distribution function, the first entropy, and the second entropy.

Aspect 4: The method of aspect 3, wherein the compression level report comprises one or more of the joint probability distribution function, the first entropy, and the second entropy, the method further comprising: receiving a third quantity of frames that are compressed in accordance with a third compression scheme, the third quantity of frames representative of third content recorded by the first source device based at least in part on the compression level report and a corresponding capability of the first source device.

Aspect 5: The method of any of aspects 1 through 4, further comprising: receiving, from the first source device, the second source device, or both, a capability message that indicates a corresponding source device is enabled to switch from processing video frames in accordance with the first compression scheme to processing video frames in accordance with a different compression scheme.

Aspect 6: The method of any of aspects 1 through 4, further comprising: transmitting, to the first source device and the second source device, a capability message that indicates the wireless communications device is enabled to determine the correlation between the first content of the first quantity of frames and the second content of the second quantity of frames and transmit the compression level report.

Aspect 7: The method of any of aspects 1 through 6, wherein the second compression scheme indicates a change in bit rate, discrete cosine transform decimation rate, error correcting coding rate, or any combination thereof, with respect to the first compression scheme.

Aspect 8: The method of any of aspects 1 through 7, wherein the first source device and the second source device each comprise an XR device each having at least one camera.

Aspect 9: The method of any of aspects 1 through 7, wherein the first source device and the second source device each comprise a camera of an XR device.

Aspect 10: The method of any of aspects 1 through 9, wherein the wireless communications device comprises a UE, a network entity, or a cloud edge processing unit.

Aspect 11: A method for wireless communication at a first source device, comprising: transmitting, to a wireless communications device, a first quantity of frames that are compressed in accordance with a first compression scheme, the first quantity of frames representative of first content recorded by the first source device; receiving, from the wireless communications device, a compression level report that indicates a second compression scheme for compression of additional quantities of frames from the first source device, wherein the second compression scheme is associated with reduced processing with respect to processing associated with the first compression scheme, wherein the reduced processing is based at least in part on a correlation between the first content of the first quantity of frames and second content of a second quantity of frames, and wherein the second content is recorded by a second source device; and transmitting, to the wireless communications device, a third quantity of frames that are compressed in accordance with the second compression scheme, the third quantity of frames representative of third content recorded by the first source device.

Aspect 12: The method of aspect 11, wherein the compression level report comprises a first set of compression parameters for the first source device, a second set of compression parameters for the second source device, or both.

Aspect 13: The method of any of aspects 11 through 12, wherein the correlation is determined based at least in part on an estimated joint probability distribution function associated with the first quantity of frames and the second quantity of frames, a first entropy associated with the first quantity of frames, and a second entropy associated with the second quantity of frames.

Aspect 14: The method of aspect 13, wherein the compression level report comprises one or more of the estimated joint probability distribution function, the first entropy, and the second entropy, the method further comprising: determining the second compression scheme based at least in part on a capability of the first source device and the compression level report, wherein transmitting the third quantity of frames processed in accordance with the second compression scheme is based at least in part on the determining.

Aspect 15: The method of any of aspects 11 through 14, further comprising: transmitting a capability message that indicates that the first source device is enabled to switch from processing video frames in accordance with the first compression scheme to processing video frames in accordance with a different compression scheme.

Aspect 16: The method of any of aspects 11 through 14, further comprising: receiving a capability message that indicates the wireless communications device is enabled to determine the correlation between the first content of the first quantity of frames and the second content of the second quantity of frames and transmit the compression level report.

Aspect 17: The method of any of aspects 11 through 16, wherein the second compression scheme indicates a change in bit rate, discrete cosine transform decimation rate, error correcting check coding rate, or any combination thereof, with respect to the first compression scheme.

Aspect 18: The method of any of aspects 11 through 17, wherein the first source device and the second source device each comprise an XR device each having at least one camera.

Aspect 19: The method of any of aspects 11 through 17, wherein the first source device and the second source device each comprise a camera of an XR device.

Aspect 20: The method of any of aspects 11 through 19, wherein the wireless communications device comprises a UE, a network entity, or a cloud edge processing unit.

Aspect 21: An apparatus for wireless communication at a wireless communications device, comprising a processor; memory coupled with the processor; and instructions stored in the memory and executable by the processor to cause the apparatus to perform a method of any of aspects 1 through 10.

Aspect 22: An apparatus for wireless communication at a wireless communications device, comprising at least one means for performing a method of any of aspects 1 through 10.

Aspect 23: A non-transitory computer-readable medium storing code for wireless communication at a wireless communications device, the code comprising instructions executable by a processor to perform a method of any of aspects 1 through 10.

Aspect 24: An apparatus for wireless communication at a first source device, comprising a processor; memory coupled with the processor; and instructions stored in the memory and executable by the processor to cause the apparatus to perform a method of any of aspects 11 through 20.

Aspect 25: An apparatus for wireless communication at a first source device, comprising at least one means for performing a method of any of aspects 11 through 20.

Aspect 26: A non-transitory computer-readable medium storing code for wireless communication at a first source device, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a wireless communications device, comprising:
one or more processors;
one or more memories coupled with the one or more processors; and
instructions stored in the one or more memories and executable by the one or more processors to cause the apparatus to:
receive, from a first source device, a first quantity of frames that are compressed in accordance with a first compression scheme, the first quantity of frames representative of first content recorded by the first source device;
receive, from a second source device, a second quantity of frames that are compressed in accordance with the first compression scheme, the second quantity of frames representative of second content recorded by the second source device;
estimate a first entropy associated with the first quantity of frames and a second entropy associated with the second quantity of frames; and
transmit, from the wireless communications device to at least the first source device, a compression level report that indicates a second compression scheme for compression of additional quantities of frames from the first source device, wherein the second compression scheme is associated with reduced processing with respect to processing associated with the first compression scheme, and wherein the reduced processing is based at least in part on a correlation that is derived from at least one of the first entropy, the second entropy, or a joint probability distribution function for the first content of the first quantity of frames and the second content of the second quantity of frames.

2. The apparatus of claim 1, wherein the instructions are further executable by the one or more processors to cause the apparatus to:
determine a set of compression parameters for the second compression scheme for the compression of the additional quantities of frames from the first source device, wherein the compression level report comprises an indication of the set of compression parameters.

3. The apparatus of claim 1, wherein the instructions are further executable by the one or more processors to cause the apparatus to:
estimate the joint probability distribution function associated with the first quantity of frames and the second quantity of frames.

4. The apparatus of claim 1, wherein the compression level report comprises one or more of the joint probability distribution function, the first entropy, or the second entropy, and the instructions are further executable by the one or more processors to cause the apparatus to:
receive a third quantity of frames that are compressed in accordance with a third compression scheme, the third quantity of frames representative of third content recorded by the first source device based at least in part on the compression level report and a corresponding capability of the first source device.

5. The apparatus of claim 1, wherein the instructions are further executable by the one or more processors to cause the apparatus to:
receive, from the first source device, the second source device, or both, a capability message that indicates a corresponding source device is enabled to switch from processing video frames in accordance with the first compression scheme to processing video frames in accordance with a different compression scheme.

6. The apparatus of claim 1, wherein the instructions are further executable by the one or more processors to cause the apparatus to:

transmit, to the first source device and the second source device, a capability message that indicates the wireless communications device is enabled to determine the correlation between the first content of the first quantity of frames and the second content of the second quantity of frames and transmit the compression level report.

7. The apparatus of claim 1, wherein the second compression scheme indicates a change in bit rate, a change in discrete cosine transform decimation rate, a change in error correcting coding rate, or any combination thereof, with respect to the first compression scheme.

8. The apparatus of claim 1, wherein the first source device and the second source device each comprise an extended reality device each having at least one camera.

9. The apparatus of claim 1, wherein the first source device and the second source device each comprise a camera of an extended reality device.

10. The apparatus of claim 1, wherein the wireless communications device comprises a user equipment, a network entity, or a cloud edge processing unit.

11. An apparatus for wireless communication at a first source device, comprising:
one or more processors;
one or more memories coupled with the one or more processors; and
instructions stored in the one or more memories and executable by the one or more processors to cause the apparatus to:
transmit, to a wireless communications device, a first quantity of frames that are compressed in accordance with a first compression scheme, the first quantity of frames representative of first content recorded by the first source device;
receive, from the wireless communications device, a compression level report that indicates a second compression scheme for compression of additional quantities of frames from the first source device, wherein the second compression scheme is associated with reduced processing with respect to processing associated with the first compression scheme, wherein the reduced processing is based at least in part on a correlation that is derived from at least one of a first entropy, a second entropy, or a joint probability distribution function for the first content of the first quantity of frames and second content of a second quantity of frames recorded by a second source device; and
transmit, to the wireless communications device, a third quantity of frames that are compressed in accordance with the second compression scheme, the third quantity of frames representative of third content recorded by the first source device.

12. The apparatus of claim 11, wherein the compression level report comprises a first set of compression parameters for the first source device, a second set of compression parameters for the second source device, or both.

13. The apparatus of claim 11, wherein the compression level report comprises one or more of the joint probability distribution function, the first entropy, or the second entropy, and the instructions are further executable by the one or more processors to cause the apparatus to:
determine the second compression scheme based at least in part on a capability of the first source device and the compression level report, wherein transmitting the third quantity of frames processed in accordance with the second compression scheme is based at least in part on the determining.

14. The apparatus of claim 11, wherein the instructions are further executable by the one or more processors to cause the apparatus to:
transmit a capability message that indicates that the first source device is enabled to switch from processing video frames in accordance with the first compression scheme to processing video frames in accordance with a different compression scheme.

15. The apparatus of claim 11, wherein the instructions are further executable by the one or more processors to cause the apparatus to:
receive a capability message that indicates the wireless communications device is enabled to determine the correlation between the first content of the first quantity of frames and the second content of the second quantity of frames and transmit the compression level report.

16. The apparatus of claim 11, wherein the second compression scheme indicates a change in bit rate, discrete cosine transform decimation rate, error correcting check coding rate, or any combination thereof, with respect to the first compression scheme.

17. The apparatus of claim 11, wherein the first source device and the second source device each comprise an extended reality device each having at least one camera.

18. The apparatus of claim 11, wherein the first source device and the second source device each comprise a camera of an extended reality device.

19. The apparatus of claim 11, wherein the wireless communications device comprises a user equipment, a network entity, or a cloud edge processing unit.

20. A method for wireless communication at a wireless communications device, comprising:
receiving, from a first source device, a first quantity of frames that are compressed in accordance with a first compression scheme, the first quantity of frames representative of first content recorded by the first source device;
receiving, from a second source device, a second quantity of frames that are compressed in accordance with the first compression scheme, the second quantity of frames representative of second content recorded by the second source device;
estimating a first entropy associated with the first quantity of frames and a second entropy associated with the second quantity of frames; and
transmitting, from the wireless communications device to at least the first source device, a compression level report that indicates a second compression scheme for compression of additional quantities of frames from the first source device, wherein the second compression scheme is associated with reduced processing with respect to processing associated with the first compression scheme, and wherein the reduced processing is based at least in part on a correlation that is derived from at least one of the first entropy, the second entropy, or a joint probability distribution function for the first content of the first quantity of frames and the second content of the second quantity of frames.

21. The method of claim 20, further comprising:
determining a set of compression parameters for the second compression scheme for the compression of the additional quantities of frames from the first source device, wherein the compression level report comprises an indication of the set of compression parameters.

22. The method of claim 20, comprising:
estimating the joint probability distribution function associated with the first quantity of frames and the second quantity of frames.

23. The method of claim 20, wherein the compression level report comprises one or more of the joint probability distribution function, the first entropy, or the second entropy, the method further comprising:
receiving a third quantity of frames that are compressed in accordance with a third compression scheme, the third quantity of frames representative of third content recorded by the first source device based at least in part on the compression level report and a corresponding capability of the first source device.

24. The method of claim 20, further comprising:
receiving, from the first source device, the second source device, or both, a capability message that indicates a corresponding source device is enabled to switch from processing video frames in accordance with the first compression scheme to processing video frames in accordance with a different compression scheme.

25. The method of claim 20, further comprising:
transmitting, to the first source device and the second source device, a capability message that indicates the wireless communications device is enabled to determine the correlation between the first content of the first quantity of frames and the second content of the second quantity of frames and transmit the compression level report.

26. A method for wireless communication at a first source device, comprising:
transmitting, to a wireless communications device, a first quantity of frames that are compressed in accordance with a first compression scheme, the first quantity of frames representative of first content recorded by the first source device;
receiving, from the wireless communications device, a compression level report that indicates a second compression scheme for compression of additional quantities of frames from the first source device, wherein the second compression scheme is associated with reduced processing with respect to processing associated with the first compression scheme, wherein the reduced processing is based at least in part on a correlation that is derived from at least one of a first entropy, a second entropy, or a joint probability distribution function for the first content of the first quantity of frames and second content of a second quantity of frames recorded by a second source device; and
transmitting, to the wireless communications device, a third quantity of frames that are compressed in accordance with the second compression scheme, the third quantity of frames representative of third content recorded by the first source device.

27. The method of claim 26, wherein the compression level report comprises a first set of compression parameters for the first source device, a second set of compression parameters for the second source device, or both.

28. The method of claim 26, wherein the compression level report comprises one or more of the joint probability distribution function, the first entropy, or the second entropy, the method further comprising:
determining the second compression scheme based at least in part on a capability of the first source device and the compression level report, wherein transmitting the third quantity of frames processed in accordance with the second compression scheme is based at least in part on the determining.

* * * * *